US010116205B2

(12) United States Patent
Arisawa et al.

(10) Patent No.: US 10,116,205 B2
(45) Date of Patent: Oct. 30, 2018

(54) POWER CONVERSION DEVICE AND REFRIGERATING AND AIR-CONDITIONING APPARATUS

(71) Applicant: Mitsubishi Electric Corporation, Tokyo (JP)

(72) Inventors: Koichi Arisawa, Tokyo (JP); Takuya Shimomugi, Tokyo (JP); Takashi Yamakawa, Tokyo (JP); Keisuke Uemura, Tokyo (JP); Noriyuki Matsubara, Tokyo (JP); Shinsaku Kusube, Tokyo (JP); Kenta Yuasa, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 14/901,251

(22) PCT Filed: Jul. 2, 2014

(86) PCT No.: PCT/JP2014/067691
§ 371 (c)(1),
(2) Date: Dec. 28, 2015

(87) PCT Pub. No.: WO2015/002248
PCT Pub. Date: Jan. 8, 2015

(65) Prior Publication Data
US 2016/0305417 A1    Oct. 20, 2016

(30) Foreign Application Priority Data

Jul. 2, 2013   (WO) .................. PCT/JP2013/068161

(51) Int. Cl.
*H02M 1/42*    (2007.01)
*H02M 3/158*   (2006.01)
(Continued)

(52) U.S. Cl.
CPC ........... *H02M 1/4208* (2013.01); *H02M 1/34* (2013.01); *H02M 3/158* (2013.01);
(Continued)

(58) Field of Classification Search
CPC ............. H02M 1/4208; H02M 1/4225; H02M 1/4258; H02M 1/425; H02M 2001/4283;
(Continued)

(56) References Cited

U.S. PATENT DOCUMENTS 6,023,158 A    2/2000  Liu
6,924,630 B1   8/2005  Pacala
(Continued)

FOREIGN PATENT DOCUMENTS

CN    103125066 A    5/2013
JP    2005-160284 A  6/2005
(Continued)

OTHER PUBLICATIONS

Japanese Office Action dated Jan. 17, 2017 in the corresponding JP application No. 2015-525262. (English translation attached).
(Continued)

*Primary Examiner* — Nguyen Tran
(74) *Attorney, Agent, or Firm* — Posz Law Group, PLC

(57) ABSTRACT

Provided is a power conversion device configured to convert electric power from a power source to a load, including: a boosting device including a boost rectification unit configured to prevent backflow of a current from the load side to the power source side, the boosting device being configured to change a voltage of power from the power source to a predetermined voltage based on a drive signal; a commutation device configured to perform commutation operation in which a current flowing through the boosting device is caused to flow into an other path based on a commutation signal; and a signal generating module device configured as
(Continued)

a module to generate and send an output signal based on an input signal that is input thereto. The input signal has an on-pulse width greater than a length of time where the output signal generated by the signal generating module device is turned on.

13 Claims, 21 Drawing Sheets

(51) Int. Cl.
*H02M 1/34* (2007.01)
*H02M 1/00* (2006.01)

(52) U.S. Cl.
CPC .. *H02M 3/1584* (2013.01); *H02M 2001/0051* (2013.01); *H02M 2001/342* (2013.01); *Y02B 70/1491* (2013.01)

(58) Field of Classification Search
CPC ....... H02M 2001/4291; H02M 3/1584; H02M 3/285; G05F 1/70; H02J 3/46; H02J 3/38
USPC ................ 363/65, 89–90; 323/207, 222
See application file for complete search history.

(56) References Cited

U.S. PATENT DOCUMENTS

| 8,120,340 | B2* | 2/2012 | Chen | H02M 1/4225 323/272 |
|---|---|---|---|---|
| 8,493,754 | B1* | 7/2013 | Wambsganss | H02M 1/4216 323/284 |
| 2002/0047693 | A1 | 4/2002 | Chang | |
| 2006/0284487 | A1 | 12/2006 | Tang et al. | |
| 2013/0152624 | A1 | 6/2013 | Arisawa et al. | |

FOREIGN PATENT DOCUMENTS

| JP | 2006-353088 A | 12/2006 |
| JP | 2013-59158 A | 3/2013 |
| WO | 2012/042579 A1 | 4/2012 |
| WO | 2012/137258 A1 | 10/2012 |

OTHER PUBLICATIONS

Korean Office Action dated Feb. 1, 2017 in the corresponding Korean application No. 10-2015-7036706. (English translation attached).
Extended European Search Report dated Jan. 26, 2017 in the corresponding EP application No. 14820025.6.
International Search Report of the International Searching Authority dated Aug. 12, 2014 for the corresponding international application No. PCT/JP2014/067691 (and English translation).
Chinese Office Action dated Jun. 1, 2017 for the corresponding CN application No. 201480037690.6(English translation attached).
Office Action dated Sep. 26, 2017 corresponding to Korean patent application No. 10-2015-7036706 (and English translation attached).
Office Action dated Dec. 1, 2017 issued in corresponding CN patent application No. 201480037690.6 (and English translation attached).

* cited by examiner

POWER CONVERSION DEVICE AND REFRIGERATING AND AIR-CONDITIONING APPARATUS

CROSS REFERENCE TO RELATED APPLICATIONS

This application is a U.S. national stage application of PCT/JP2014/067691 filed on Jul. 2, 2014, which claims priority to International Application No. PCT/JP2013/068161 filed on Jul. 2, 2013, the contents of which are incorporated herein by reference.

TECHNICAL FIELD

The present invention relates to a power conversion device and a refrigerating and air-conditioning apparatus.

BACKGROUND

Along with increased practical uses of variable voltage variable frequency inverter devices and other devices, application fields of various kinds of power conversion device have been developed.

For example, technologies applied to a boost/buck converter have been actively developed for a power conversion device in recent years. Meanwhile, wide band-gap semiconductor elements and other elements containing silicon carbide or other materials as its material have also been actively developed. In regard to such novel elements, elements having a high breakdown voltage but a small current capacity (permissible current effective value) have been put into practical use mainly for rectifiers (see, for example, Patent Literature 1).

PATENT LITERATURE

Patent Literature 1: Japanese Unexamined Patent Application Publication No. 2005-160284 (FIG. 1)

Novel elements that are highly efficient, on the other hand, have many hurdles to clear to be put into practical use, and are expected to take time to gain popularity particularly as a component of an apparatus configured to convert electric power that is supplied to a motor of a compressor in an air-conditioning apparatus or the like. Some apparatus therefore include a device (circuit) configured to commutate a part of a current that flows into a rectifier to an other path, to thereby reduce a recovery current generated in the rectifier. Newly installing a device (circuit) in such apparatus is difficult. In addition, generating a signal separately from a signal for a power changing device such as a boosting device has the possibility of increasing the processing load on a controller.

SUMMARY

The present invention therefore provides a power conversion device and others capable of facilitating replacement from an existing power conversion device or the like.

A power conversion device according to one embodiment of the present invention is configured to convert electric power from a power source to a load, and includes: a voltage changing device including a rectification unit configured to prevent backflow of a current from a side of the load to a side of the power supply, the voltage changing device being configured to change a voltage of power from the power source to a predetermined voltage; a commutation device configured to perform commutation operation in which a current flowing through the voltage changing device is caused to flow into an other path; and a signal generating module device configured as a module to generate and transmit at least one of a drive signal for driving the voltage changing device or a commutation signal for driving the commutation device.

The power conversion device according to the one embodiment of the present invention, where a device dedicated to generating and transmitting at least one of the drive signal for driving the voltage changing device or the commutation signal for driving the commutation device is configured as a module, may facilitate switching from a power conversion device of the related art. In addition, letting the module side handle high speed processing for output signal generation makes the on-pulse width of an input signal greater than the on-time of an output signal, which means that, for example, the processing load of a controller in charge of overall control may be lightened. Further, heat generation in the controller may be suppressed, and the number of input/output terminals may be reduced.

DETAILED DESCRIPTION

Figure 1:
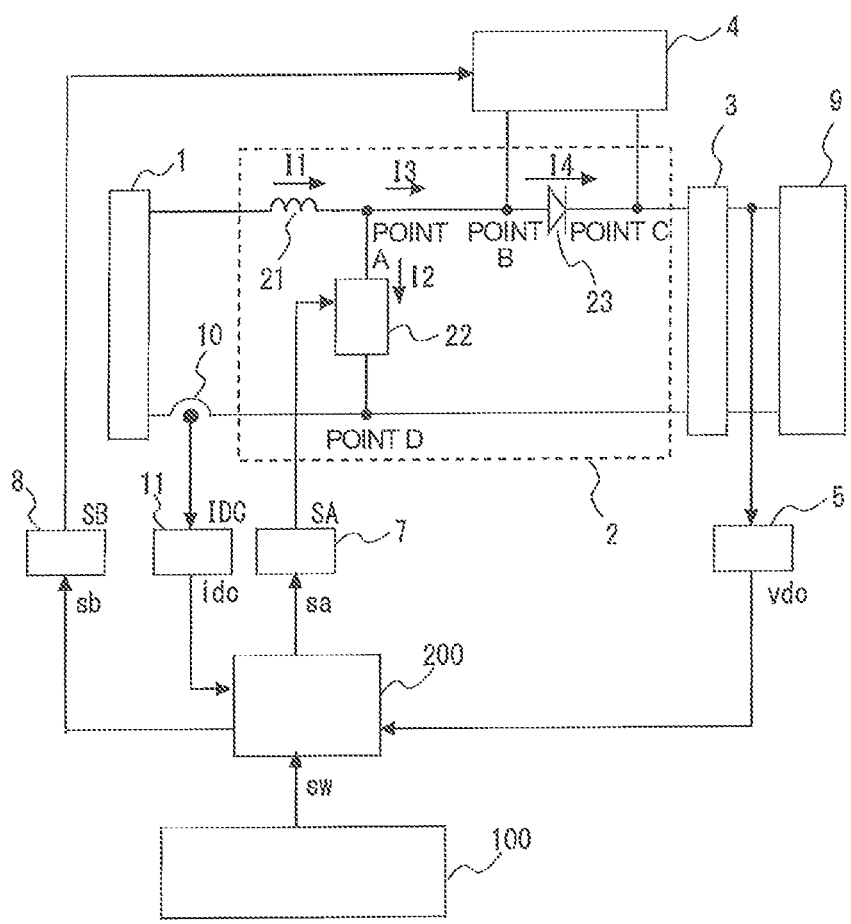
FIG. 1 is a diagram for illustrating a system configuration mainly including a power conversion device according to Embodiment 1 of the present invention.

Now, a power conversion device and the like according to embodiments of the present invention are described with reference to the drawings. In the following drawings, including FIG. 1, the same or corresponding parts are denoted by the same reference symbols, which is common to the entire contents of the following embodiments. Then, the modes of components described herein are merely illustrative, and are not intended to be limited to those described herein. In particular, the combination of components is not limited to the combinations in the respective embodiments, and a component described in one embodiment may be applied to another embodiment. A plurality of pieces of equipment or the like of the same type discriminated from one another by suffixes may be denoted without the suffixes when there is no particular need to discriminate one from another or to identify a specific piece. The sizes of components relative to one another in the drawings may differ from their relative sizes in actuality.

Embodiment 1

FIG. 1 is a diagram for illustrating a system configuration mainly including a power conversion device according to Embodiment 1 of the present invention. First, with reference to FIG. 1, a description is given of the system configuration including the power conversion device capable of performing highly efficient power conversion.

In the system illustrated in FIG. 1, the power conversion device is connected between a power source 1 and a load 9. As the power source 1, various kinds of power sources such as a DC power source, a single-phase power source, and a three-phase power source may be used. In the following description, the power source 1 is a DC power source. Further, the load 9 is, for example, a motor and an inverter device connected to the motor.

The power conversion device includes a boosting device (boosting circuit) 2, a commutation device (commutation circuit) 4, and a smoothing device (smoothing circuit) 3. The boosting device 2, which serves as a voltage changing device, boosts an applied voltage relating to power supply from the power source 1 to a predetermined voltage. The commutation device 4 commutates a current flowing through the boosting device 2 to a different path (other path) at necessary timing. The smoothing device 3 smoothes out a voltage relating to the operation of the boosting device 2 and the commutation device 4 (output voltage).

The boosting device 2 in this embodiment includes, for example, a magnetic energy storage unit 21 constructed with a reactor connected to the positive side or the negative side of the power source 1, and a boost open/close switch unit 22 (power change open/close switch 22) and a boost rectification unit 23 (power change rectification unit 23) constructed with a rectifier, which are connected at a subsequent stage of the magnetic energy storage unit 21. In this case, as illustrated in FIG. 1, the rectifier of the boost rectification unit 23 has an anode on the point B side and a cathode on the point C side. The boost open/close switch unit 22 including a switching element, for example, is opened and closed based on a drive signal SA transmitted from the drive signal transmission device 7, and controls electrical connection and electrical disconnection between the positive side and the negative side of the power source 1 via the boost open/close switch unit 22. The type of semiconductor element used as the switching element is not particularly limited, but a high withstand voltage element that may withstand electric power supplied from the power source 1 is used (for example, an insulated gate bipolar transistor (IGBT), a metal oxide semiconductor field effect transistor (MOSFET), etc.). In this case, although not shown in FIG. 1, the boost open/close switch unit 22 is supplied with electric power for performing the open/close operation from a switch operation power source. Further, the boost rectification unit 23 constructed with a rectifier such as a pn junction diode, for example, is a backflow preventing element configured to rectify a current (electric power) from the power source 1 side to the load 9 side and prevent the backflow from the load 9 side to the power source 1 side. In this embodiment, a rectifier having a large current capacity is used depending on the magnitude of electric power to be supplied from the power source 1 to the load 9. Further, in order to suppress electric power (energy) loss in the boost rectification unit 23, an element having a low forward voltage (good Vf characteristics) is used for the rectification. A device including at least the boost rectification unit 23, which serves as the backflow preventing element, and the commutation device 4 serves as a backflow preventing device configured to prevent backflow of a current from the load 9 side to the power source 1 side. The boost rectification unit 23 of the boosting device 2 herein serves as the backflow preventing element, but another element may serve as the backflow preventing element to form the backflow preventing device.

Figure 2:
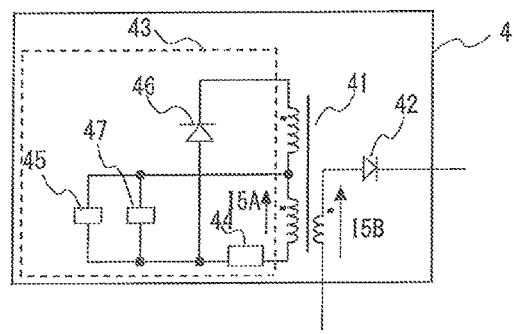
FIG. 2 is a diagram for illustrating a configuration example of a commutation device 4 according to Embodiment 1 of the present invention.

FIG. 2 is a diagram for illustrating a configuration example of the commutation device 4 according to Embodiment 1 of the present invention. The commutation device 4 in this embodiment includes a transformer 41, a commutation rectification unit 42, elements of a transformer drive circuit 43 configured to drive the transformer 41, and other components. In FIG. 2, primary-side and secondary-side windings of the transformer 41 have the same polarity. Then, the secondary-side winding of the transformer 41 is connected in series to the commutation rectification unit 42. In addition, the commutation rectification unit 42 is connected in parallel to the boost rectification unit 23 of the boosting device 2.

The transformer 41 including a pulse transformer, for example, constructs a commutation operation device together with the transformer drive circuit 43. A voltage is applied to the primary-side winding to cause an excitation current to flow therethrough, to thereby induce a voltage in the secondary-side winding to cause a current to flow therethrough. In this manner, the current flowing through the boosting device 2 is commutated. For example, by adjusting the turns ratio, inductance ratio, or the like of the primary-side winding and the secondary-side winding in the transformer 41, an adjustment may be made to reduce excess voltage while generating a voltage equal to or higher than a level necessary for reverse recovery of the boost rectification unit 23 (rectifier) (about several V). The reverse recovery is thus accomplished without causing an excessive current flow on the commutation device 4 side or the like, and energy may be saved in a simple manner. Further, the primary-side winding of the transformer 41 in this embodiment is provided with a reset winding. Through the provision of the reset winding, excitation energy may be regenerated on a transformer power source unit 45 side at the time of resetting so that electric power may be recovered, and hence the efficiency may be further increased.

The commutation rectification unit 42 rectifies the current relating to the commutation (the current flowing through the other path). In this case, the commutation rectification unit 42 is constructed by connecting a rectifier including, for example, a semiconductor element which has excellent electrical characteristics (in particular, recovery characteristics), has a small current capacity, and takes a short time to complete the reverse recovery. The rectifier is located on a path of the electric power supplied from the power source 1 to the load 9, and hence is required to be formed of a high withstand voltage element. Thus, in this case, a Schottky barrier diode made of silicon having good recovery characteristics in particular, or an element formed of, for example, a wide band-gap semiconductor containing silicon carbide (SiC), gallium nitride (GaN), or diamond as its material is used for the rectifier of the commutation rectification unit 42.

Further, in this embodiment, the transformer drive circuit 43 is constructed with a commutation switch 44, the transformer power source unit 45, a transformer drive rectification unit 46, and a transformer smoothing unit 47. The commutation switch 44 including a switching element such as a transistor, for example, is opened or closed based on the commutation signal SB transmitted from the commutation signal transmission device 8, to thereby supply electric power from the transformer power source unit 45 to the transformer 41 (primary winding side) or stop the supply of the electric power. In this case, the switching element may include an insulating unit configured to insulate the gate side and the drain (collector)-source (emitter) side from each other. In this case, it is preferred that the insulating unit be constructed with a photocoupler or a pulse transformer. Because the insulating unit is formed, the commutation device 4 may be electrically disconnected from the control side such as the controller 100, to thereby prevent an excessive current from flowing to the control side. The transformer power source unit 45 serves as, for example, a power source configured to supply electric power to the transformer 41 so as to cause the commutation device 4 to perform the commutation operation. Then, the voltage to be applied from the transformer power source unit 45 to the transformer 41 is set to be lower than the voltage (output voltage) to be applied from the boosting device 2 and the commutation device 4 to the smoothing device 3. In this case, although not particularly shown in FIG. 1, a limiting resistor, a high frequency capacitor, a snubber circuit, or a protective circuit may be inserted as necessary into a wiring path connecting the transformer power source unit 45, the commutation switch 44, and the primary-side winding of the transformer 41 in consideration of noise countermeasures, circuit protection in case of failure, and other circumstances. Further, the transformer power source unit 45 may be shared with the power source used for the boost open/close switch unit 22 to perform the opening and closing operation. The transformer drive rectification unit 46 rectifies a current flowing through the transformer drive circuit 43 to supply electric power to the primary-side winding of the transformer 41. Further, the transformer smoothing unit 47 including a capacitor smoothes the electric power from the transformer power source unit 45 and supplies the smoothed electric power to the primary-side winding. Because the transformer smoothing unit 47 is provided to smooth the electric power, for example, an abrupt fluctuation of the transformer power source unit 45, an abrupt rise of the current, and other phenomena may be suppressed.

The smoothing device 3 is constructed with a smoothing capacitor, for example. The smoothing device 3 smoothes a voltage relating to the operation of the boosting device 2 and other devices, and applies the smoothed voltage to the load 9. Further, the voltage detection device 5 detects a voltage VDC smoothed by the smoothing device 3, and transmits a signal Vdc. The voltage detection device 5 is constructed with a level shift circuit including voltage dividing resistors. In this case, when needed, the voltage detection device 5 may be added with an analog/digital converter in order to generate a signal (data) that may be used for the controller 100 to perform arithmetic processing and other processing.

The system of this embodiment also includes the voltage detection device 5, a current detection element 10, and a current detection device 11. The voltage detection device 5 detects the voltage VDC (a load voltage applied to the load 9) obtained in the smoothing device 3, and transmits the signal Vdc to a signal generating module device 200. The current detection element 10 detects a current at a node between the power source 1 and the negative side of the boost open/close switch unit 22. The current detection element 10 is constructed with, for example, a current transformer, or a shunt resistor. The current detection device 11 includes an amplifier circuit, a level shift circuit, a filter circuit, and others to convert a current IDC, which relates to the detection by the current detection element 10, into a signal Idc, which is processable by the signal generating module device 200, and to transmit the signal Idc. In the case where the functions of the current detection device 11 may be handled instead by the signal generating module device 200, the controller 100, or other devices, an appropriate circuit or other appropriate components may be omitted. Some of the voltage detection device 5, the current detection element 10, and the current detection device 11, which are all included in the power conversion device of FIG. 1, may also be omitted because the signal generating module device 200 is capable of signal generation and the like based on a current or a voltage relating to detection. The power conversion device therefore may include only the voltage detection device 5, or only the current detection element 10 and the current detection device 11.

The controller 100 controls the boosting device 2 and the commutation device 4. The controller 100 is constructed with an arithmetic unit such as a microcomputer or a digital signal processor, or with a device that contains functions equivalent to those of an arithmetic unit, or with similar others. The controller 100 of this embodiment transmits to the signal generating module device 200 an operation signal sw for putting the boosting device 2 and the commutation device 4 into or out of operation (for turning the boosting device 2 and the commutation device 4 on or off). Though not shown, the controller 100 may be a device external to the power conversion device. The controller 100 may control the devices that serve as the load 9 in addition to controlling the power conversion device.

The signal generating module device 200 generates, as output signals, a drive signal sa for running the boosting device 2 and a commutation signal sb for running the commutation device 4 and sends the output signals respectively to the boosting device 2 and the commutation device 4 during, for example, a period where the boosting device 2 and the commutation device 4 are instructed to run by the operation signal sw from the controller 100 which serves as an input signal. In this embodiment, the boosting device 2 and the commutation device 4 are controlled by generating a signal for instructing the boost open/close switch unit 22 and the commutation switch 44 to run based on, for example, at least one of the voltage relating to the detection by the voltage detection device 5 or the current relating to the detection by the current detection element 10 and the current detection device 11.

This embodiment further includes the drive signal transmission device 7 configured to convert the drive signal sa, which is a signal from the signal generating module device 200, into the drive signal SA, which is suited to the boosting device 2, and to transmit the drive signal SA to the boosting device 2. Also included is the commutation signal transmission device 8 configured to convert the drive signal (commutation signal) sb, which is a signal from the signal generating module device 200, into the commutation signal SB, which is suited to the commutation device 4, and to transmit the commutation signal SB to the commutation device 4.

The drive signal transmission device 7 includes a buffer, a logic IC, or a level shift circuit, for example, and converts the drive signal sa into the drive signal SA, which is suited to the boosting device 2, and transmits the drive signal SA to the boosting device 2. The commutation signal transmission device 8 includes a buffer, a logic IC, a level shift circuit, and others. The commutation signal transmission device 8 converts the commutation signal sb into the commutation signal SB, which is suited to the commutation device 4, and transmits the commutation signal SB to the commutation device 4. It can be considered that, in terms of the operation of the power conversion device, there is no particular difference between the drive signal SA and the drive signal sa, and between the commutation signal SB and the commutation signal sb. The following description therefore treats the drive signal SA as a signal that is the same as the drive signal sa, and the commutation signal SB as a signal that is the same as the commutation signal sb (the drive signal SA and the commutation signal SB are accordingly hereinafter denoted as drive signal sa and commutation signal sb, respectively).

As described above, the controller 100 includes a microcomputer or a digital signal processor, for example. However, controlling the boosting device 2 and the commutation device 4 with the controller 100 in addition to the existing power conversion device may be difficult to accomplish due to a shortage of resources (for example, the number of pins and computing performance) of the controller 100. The system of this embodiment therefore includes the signal generating module device 200, which is capable of generating the drive signal sa and the commutation signal sb. The use of the module makes it relatively easy to replace a power conversion device of the related art with the power conversion device of this embodiment. Accordingly, a system with a power conversion device that includes the boosting device 2 and the commutation device 4 is attained without complicating the design much.

The operation is described next. The controller 100 uses the operation signal sw to instruct the boosting device 2 to run when, for example, power is supplied to the load 9 through boosting by the boosting device 2. In the case where the boosting device 2 is not to be put into operation, the operation instruction via the operation signal sw is not given (a state in which operation stopping signals are kept sent). Whether the controller 100 is to issue the operation instruction via the operation signal sw may be determined by, for example, determining the state of an on/off signal SW of the boosting device 2 based on the elapsed time, the state of the load 9, or the like, while taking conditions of the system into consideration.

Alternatively, the signal generating module device 200 may send an operation request signal with regards to the determination of the controller 100. For example, it is the signal generating module device 200 in this embodiment that receives the signal Vdc, which relates to the voltage VDC detected by the voltage detection device 5 and varying depending on the load 9, and the signal Idc, which relates to the current IDC detected by the current detection element 10 and the current detection device 11. The signal generating module device 200 therefore may substantially determine whether to put the boosting device 2 and the commutation device 4 into operation, send an operation request signal to the controller 100, and receive the operation signal sw regarding an operation instruction from the controller 100.

The operation relating to the system of FIG. 1 and other drawings is described next. Power conversion operation (boosting operation in this embodiment) of the power conversion device in this system is the operation of a boost chopper to which commutation operation in the commutation device 4 is added.

For example, when the boost open/close switch unit 22 is on (closed) and the commutation switch 44 is off (opened), no current flows through the path along which the commutation device 4 is provided (the other path). With the boost open/close switch unit 22 switched on, electrical connection is established between the positive side and negative side of the power source 1 on a path of FIG. 2, thereby causing a current to flow along the path and allowing the magnetic energy storage unit 21 to accumulate energy.

When the boost open/close switch unit 22 is off and the commutation switch 44 is off, no current flows through the other path. With the boost open/close switch unit 22 switched off, the energy in the magnetic energy storage unit 21 may be supplied to the load 9 side via the smoothing device 3 along the path that runs through the boost rectification unit 23.

When the boost open/close switch unit 22 is on and the commutation switch 44 is on, a current hardly flows through the other path. Energy is accordingly accumulated in the magnetic energy storage unit 21.

When the boost open/close switch unit 22 is off and the commutation switch 44 is on, a current flows into the load 9 side via the boost rectification unit 23. With the commutation switch 44 switched on, the transformer 41 is excited, thereby causing a current to flow also through the path where the commutation device 4 is provided. After this state lasts for a certain period of time, commutation is completed to permit a flow of current only through the other path.

Of the open-close combinations of the boost open/close switch unit 22 and the commutation switch 44 described above, the commutation operation occurs when the boost open/close switch unit 22 is off and the commutation switch 44 is on, and the system behaves after the manner of a boost chopper in the other cases.

Next, a recovery current is described. When a pn junction diode, for example, is used for the boost rectification unit 23, a short-circuit current, which serves as a recovery current, flows until the reverse recovery of the boost rectification unit 23 is completed (until a reverse current is inhibited). Then, the circuit loss is increased due to the recovery current flowing from the load 9 (smoothing device 3) side to the power source 1 side. Further, this current is responsible for displacement of a common-mode current, resulting in an increase in level of noise terminal voltage, radiation noise, and the like. Accordingly, cost is required for noise countermeasures. Further, a noise filter (not shown) is upsized, and the degree of freedom of installation space is limited.

Further, in general, a rectifier has a tendency that the amount of stored carriers increases as the current capacity increases. Accordingly, when the current capacity increases, the recovery current also increases due to a delay of reverse recovery. Further, the recovery current also increases as the applied reverse bias voltage becomes higher.

In view of the above, in this embodiment, the reverse recovery is not performed in a manner that a high reverse bias voltage is applied to the boost rectification unit 23 having a large current capacity, but the reverse recovery is performed in a manner that the other path for commutation is provided and at the timing immediately before the boost open/close switch unit 22 is turned on (closed), a low reverse bias voltage is applied to the boost rectification unit 23 via the transformer 41 and the commutation rectification unit 42 of the commutation device 4, and thereafter the boost open/close switch unit 22 is controlled to be turned on (this control is hereinafter referred to as "commutation control").

Then, the signal generating module device 200 turns on the commutation signal sb for the commutation device 4 immediately before turning on the drive signal sa, to thereby generate the signal for commutating the current flowing through the boost rectification unit 23 to the commutation rectification unit 42 via the transformer 41.

Figure 3A:
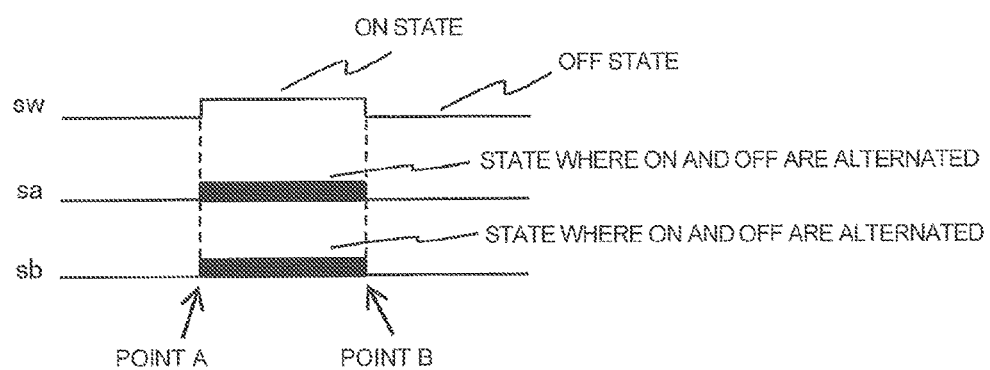
FIG. 3A is a diagram for illustrating the waveforms of signals and the like that are observed when boosting and commutation control are executed in a system according to Embodiment 1 of the present invention.

FIG. 3A is a diagram for illustrating the waveforms of signals and the like that are observed when the boosting and the commutation control are executed in the system according to Embodiment 1 of the present invention. FIG. 3A is an illustration of the waveform of the operation signal sw, which is sent from the controller 100 to run or shut down the boosting device 2 and the commutation device 4, and the waveforms of the drive signal sa and the commutation signal sb that are observed when the commutation device 4 is to be put into operation (when the commutation signal sb is to be transmitted).

As described above, the drive signal sa is a drive signal to be transmitted by the controller 100 in order to run the boost open/close switch unit 22 of the boosting device 2. Further, the commutation signal sb is a drive signal to be transmitted by the controller 100 in order to run the commutation switch 44 of the commutation device 4. In this case, the drive signal sa is a PWM signal in which the HI side is the active direction (on direction). When the drive signal sa is turned on, the boost open/close switch unit 22 is turned on (closed), and when the drive signal sa is turned off, the boost open/close switch unit 22 is turned off (opened). Further, the commutation signal sb is also a PWM signal in which the HI side is the active direction (on direction).

As illustrated in FIG. 3A, the operation signal sw maintains an off state until a point A. The drive signal sa and the commutation signal sb maintain the off state until the point A as well. At the point A, the operation signal sw enters an on state and maintains the on state until a point B. A case where the operation signal sw shifts to an off state after reaching the point B is considered. The operation signal sw may be considered as an on-pulse having a predetermined period past the point A until the point B. In a section where the operation signal sw is in an on state, the drive signal sa and the commutation signal sb each alternate between an on state and an off state. This embodiment therefore has a feature that the on-pulse of the operation signal sw is longer than the length of time where the drive signal sa and the commutation signal sb are in an on state. The drive signal sa and the commutation signal sb maintain an off state after reaching the point B.

Figure 3B:
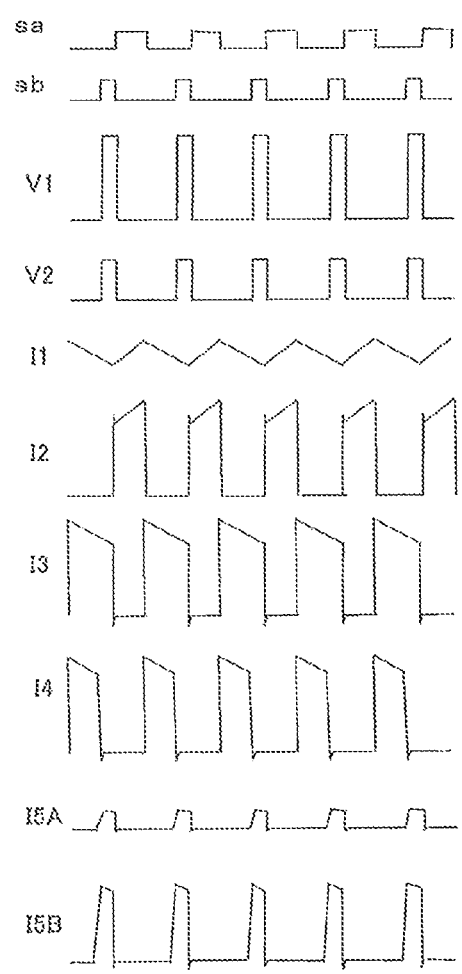
FIG. 3B is a diagram for illustrating the waveforms of signals and the like that are observed when commutation control is executed by turning an operation signal sw on in the system according to Embodiment 1 of the present invention.

FIG. 3B is a diagram for illustrating the waveforms of signals and the like that are observed when commutation control is executed by turning the operation signal sw on in the system according to Embodiment 1 of the present invention. FIG. 3B is an illustration of the waveforms of the drive signal sa and the commutation signal sb that are observed when the commutation device 4 is to be put into operation (when the commutation signal sb is to be transmitted), the waveforms of a voltage V1 and voltage V2, which relate to the primary-side winding and secondary-side winding, respectively, of the transformer 41, and the waveforms of a current I1 to a current I5. FIG. 3B is therefore an enlarged view of the respective signals in an arbitrary section between the point A to the point B in FIG. 3A.

The drive signal sa and the commutation signal sb are PWM signals as described above, and have a pulse waveform. Further, the respective current waveforms represent an example in which the on time and the off time of the drive signal sa are controlled so that the voltage VDC, that is, the output to the load 9, may become constant after the power source 1 is powered on, and a sufficient period of time has elapsed thereafter. Then, the duty ratio (the ratio between the on time and the off time) of the drive signal sa shows a substantially constant value.

The voltage V1 represents a schematic waveform of the voltage across the primary-side winding of the transformer 41. The voltage V2 represents a schematic waveform of the voltage across the secondary-side winding of the transformer 41.

The current I1 represents the waveform of the current flowing between the power source 1 and the boosting device 2 (magnetic energy storage unit 21). The current I2 represents the waveform of the current flowing through the boost open/close switch unit 22 of the boosting device 2. The current I3 represents the waveform of the current flowing between the point A and the point B of FIG. 1. In this case, the current I1 branches into the current I2 and the current I3 (I1=I2+I3).

The current I4 represents the waveform of the current flowing through the boost rectification unit 23. The current I5A represents the waveform of the current flowing through the primary winding side of the transformer 41. The current I5B represents the waveform of the current flowing through the secondary winding side of the transformer 41. In this case, the current I3 branches into the current I4 and the current I5B (I3=I4+I5B).

Next, the relationship between the drive signal sa and the commutation signal sb and the currents flowing is described with reference to FIG. 1 and FIG. 3B. When the commutation signal sb is turned on immediately before the drive signal sa is turned on (the boost open/close switch unit 22 is turned on), the current starts to flow through the secondary-side winding of the transformer 41 due to the excitation current. Accordingly, the current starts to flow while branching into the boost rectification unit 23 side and the commutation rectification unit 42 side (the other path). After that, when the on state of the commutation signal sb is maintained, the current no longer flows to the boost rectification unit 23 side, and all the currents flow to the commutation rectification unit 42 side (the commutation is completed).

At this time, the applied voltage relating to the transformer power source unit 45 is set to be sufficiently lower than the output voltage of the boosting device 2 (such as the potential between the point C and the point D). In this manner, the boost rectification unit 23 may be turned off (reverse recovery) even with a low reverse bias voltage.

Then, in this state, the drive signal sa is turned on. At this time, the reverse recovery operation is performed in the commutation rectification unit 42. Also in this case, the recovery current is generated. However, the current supply period in the reverse recovery of the commutation rectification unit 42 is significantly shorter than that for the boost rectification unit 23, and hence the value of the effective current required for the commutation rectification unit 42 may be set to be small. Consequently, an element which stores a small amount of carriers and has a small current capacity may be used, and hence the recovery current may be reduced as compared to the boost rectification unit 23 (note that, for the commutation rectification unit 42, an element is selected in consideration of the peak current).

In this case, by using the wide band-gap semiconductor for the commutation rectification unit 42, the power conversion device with low loss may be obtained. Further, because the electric power loss is small, the efficiency of the element may be increased. A wide band-gap semiconductor is high in permissible current density, and hence the use of a wide band-gap semiconductor may downsize the element and also downsize the apparatus in which the element is incorporated. A wide band-gap semiconductor may also be used for another element than the commutation rectification unit 42, for example, the commutation switch 44, which does not affect the loss in the system as a whole.

Instead of the wide band-gap semiconductor, for example, a Schottky barrier diode having a low forward voltage and a high breakdown voltage with a small loss may be used for the commutation rectification unit 42. When such element has a larger permissible current effective value according to its specifications, crystal defects are increased and the cost is increased. According to the power conversion device (system) in this embodiment, the period during which the current flows through the other path is short, and hence an element having a small permissible current effective value (having a small current capacity) may be used for the rectifier in the commutation device. Consequently, the power conversion device with high cost performance and high efficiency may be realized.

Consequently, the system of Embodiment 1 is capable of reducing a recovery current by including the commutation device 4 in the power conversion device. The on-pulse of the operation signal sw, which is output from the controller 100 to serve as an input signal of the signal generating module device 200 and which relates to the boosting device 2 and the commutation device 4, is in this case longer than the length of time where the drive signal sa and the commutation signal sb, which are output signals of the signal generating module device 200, are in an on state. The signal generating module device 200, which is a dedicated device configured as a module to generate and transmit at least one of the drive signal sa for driving the boosting device 2 or the commutation signal sb for driving the commutation device 4, enables the system to leave high speed processing for output signal generation to the module side. This means, for example, a lighter processing load with regards to the signal generation of the power conversion device on the controller 100, which executes processing of controlling other devices in parallel. The controller 100 accordingly generates less heat. The presence of the signal generating module device 200 also allows the system to reduce the number of input/output terminals from the controller 100. Further, replacement from, for example, a power conversion device of the related art which does not include the commutation device 4 may be facilitated.

Embodiment 2

Figure 4:
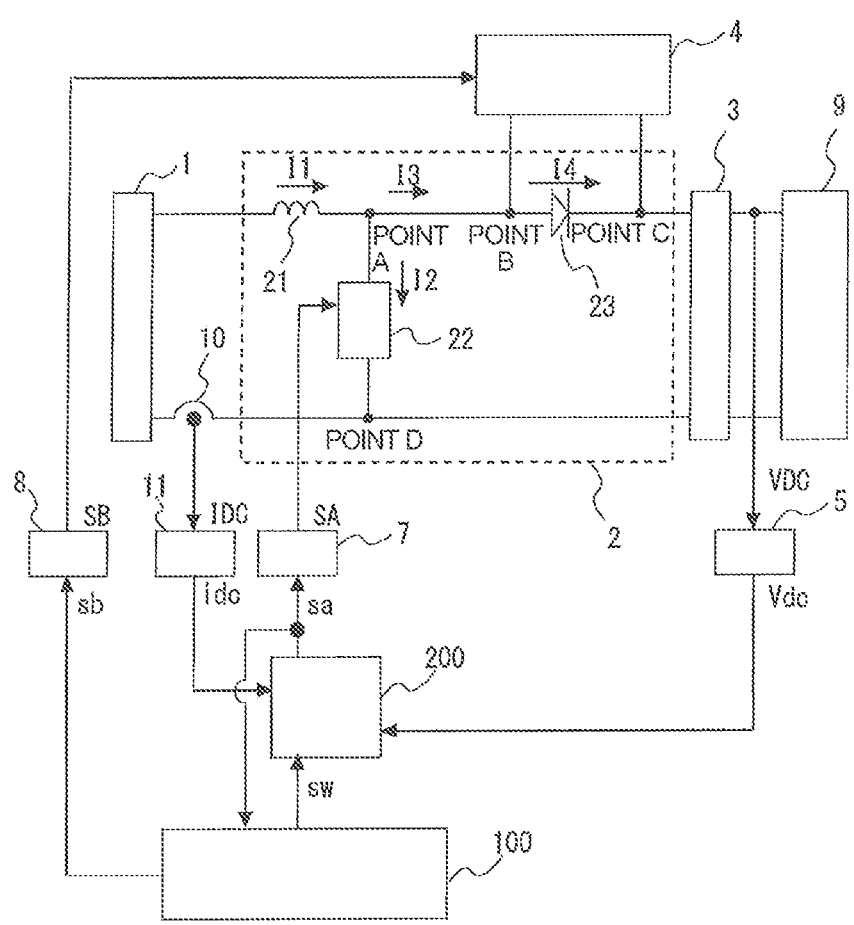
FIG. 4 is a diagram for illustrating a system configuration mainly including a power conversion device according to Embodiment 2 of the present invention.

FIG. 4 is a diagram for illustrating a system configuration mainly including a power conversion device according to Embodiment 2 of the present invention. In FIG. 4, the devices and the like denoted by the same reference symbols as those in FIG. 1 perform the same operations and the like as those described in Embodiment 1.

In Embodiment 1 described above, the signal generating module device 200 generates and transmits the drive signal sa for driving the boosting device 2 and the commutation signal sb for driving the commutation device 4. In the power conversion device of this embodiment, the signal generating module device 200 generates the drive signal sa and the controller 100 generates the commutation signal sb.

The power conversion device configured as illustrated in FIG. 4 is suitable for, for example, the case where the drive signal sa sent to the boosting device 2 is to be generated in a general manner, whereas the commutation signal sb sent to the commutation device 4 is to be generated by the controller 100. The signal generating module device 200 in this embodiment sends the generated drive signal sa to the drive signal transmission device 7 and also feeds the drive signal sa back to the controller 100. Based on the drive signal sa, the controller 100 generates the commutation signal sb that is matched to the drive signal sa in terms of timing and the like, and sends the commutation signal sb to the commutation signal transmission device 8.

In this embodiment, where the signal generating module device 200 bears a load that is incurred by generating the drive signal sa of the boosting device 2, the controller 100 is freed of this processing load. The processing load on the controller 100 may also be lessened because, as in the power conversion device of Embodiment 1, the on-pulse of the operation signal sw is longer than the length of time where the drive signal sa and the commutation signal sb are turned on, and executing high speed processing for output signal generation on the module side makes the on-pulse width of the input signal longer than the length of time where the output signal is turned on. Further, heat generation in the controller 100 may be suppressed, and the number of input/output terminals may be reduced. As described in Embodiment 1, the signal generating module device 200 may send an operation request signal to the controller 100 to determine whether the controller 100 is to put the boosting device 2 and the commutation device 4 into operation.

Embodiment 3

Figure 5:
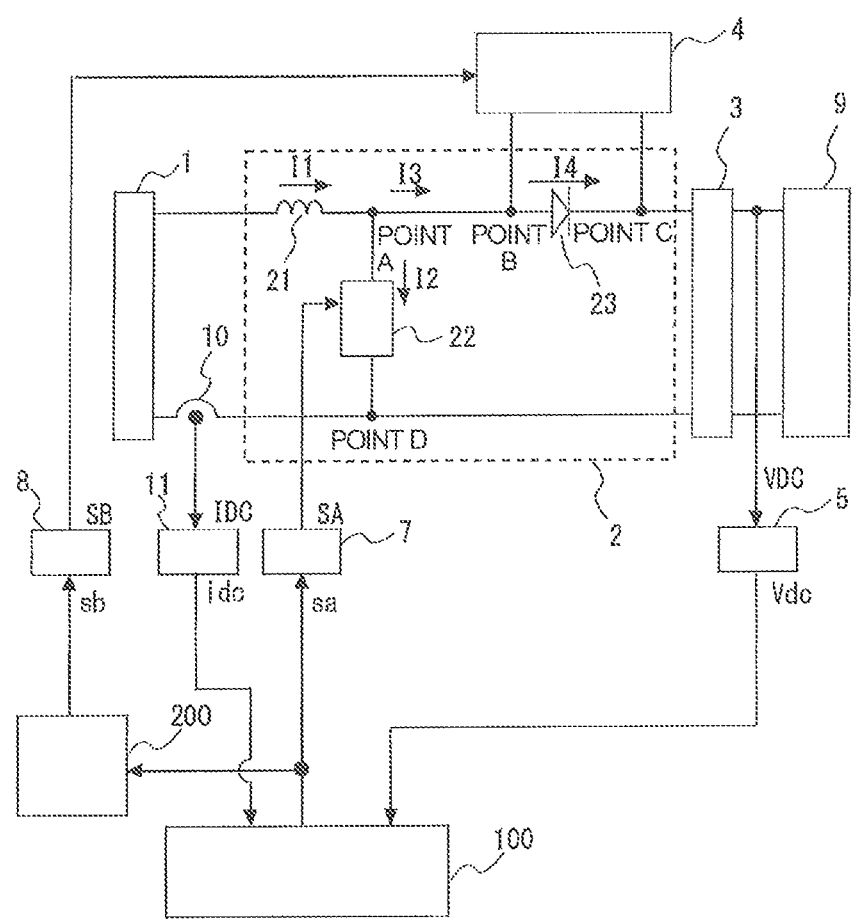
FIG. 5 is a diagram for illustrating a system configuration mainly including a power conversion device according to Embodiment 3 of the present invention.

FIG. 5 is a diagram for illustrating a system configuration mainly including a power conversion device according to Embodiment 3 of the present invention. In FIG. 5, the devices and the like denoted by the same reference symbols as those in FIG. 1 and other drawings perform the same operations and the like as those described in Embodiment 1 and other embodiments.

In Embodiment 1 described above, for example, the signal generating module device 200 generates and transmits the drive signal sa for driving the boosting device 2 and the commutation signal sb for driving the commutation device 4. In the power conversion device of this embodiment, the controller 100 generates the drive signal sa and the signal generating module device 200 generates the commutation signal sb. The drive signal sa is accordingly an input signal of the signal generating module device 200.

The power conversion device configured as illustrated in FIG. 5 is suitable for, for example, the case where the drive signal sa sent to the boosting device 2 is to be generated in the controller 100, whereas the commutation signal sb sent to the commutation device 4 is to be generated by the signal generating module device 200 in a general manner. The controller 100 in this embodiment generates the drive signal sa based on at least one of a voltage relating to the detection by the voltage detection device 5 or a current relating to the detection by the current detection element 10 and the current detection device 11. The controller 100 sends the generated drive signal sa to the drive signal transmission device 7 and to the signal generating module device 200 as well. Based on the drive signal sa, the signal generating module device 200 generates the commutation signal sb that is matched to the drive signal sa in terms of timing and the like, and sends the commutation signal sb to the commutation signal transmission device 8.

In the case where the existing controller 100 is capable of generating and sending the drive signal sa of the boosting device 2, for example, replacement from a power conversion device of the related art may be achieved with relative ease by installing the signal generating module device 200 that is capable of generating and sending the commutation signal sb of the commutation device 4. In this embodiment, when the boosting device 2 and the commutation device 4 are in operation (in a state where the operation signal sw is turned on), the controller 100 generates the drive signal sa and the signal generating module device 200 generates the commutation signal sb based on the drive signal sa. The drive signal sa and the commutation signal sb at this point differ from each other in timing as illustrated in, for example, FIG. 3B, and are not completely identical. The signal generating module device 200 may thus change the on- or off-timing of the drive signal sa serving as an input signal and the commutation signal sb serving as an output signal in a relative manner. The on-pulse of the drive signal sa serving as the input signal of the signal generating module device 200 is in general longer than the on-pulse of the commutation signal sb serving as the output signal of the signal generating module device 200. In this embodiment, where the system includes not only the controller 100 but also the signal generating module device 200, the on-pulse width of the input signal may therefore be made greater than the length of time where the output signal is turned on by letting the module side handle high speed processing for output signal generation, which means a lighter processing load on the controller 100 and less heat generation in the controller 100. The presence of the signal generating module device 200 also allows the system to reduce the number of input/output terminals from the controller 100. A power conversion device that includes the boosting device 2 and the commutation device 4 is therefore attained without complicating the design much. In addition, an increase in processing load on the controller 100 may be avoided because the controller 100 does not need to generate the commutation signal sb.

Embodiment 4

Figure 6:
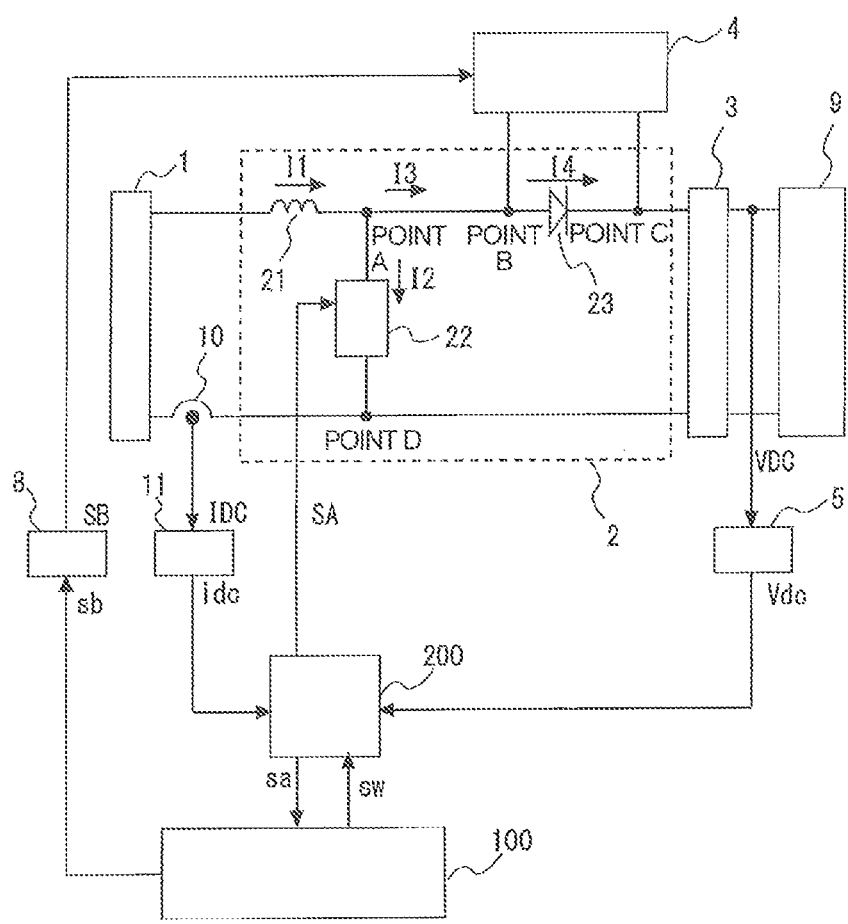
FIG. 6 is a diagram for illustrating a system configuration mainly including a power conversion device according to Embodiment 4 of the present invention.

FIG. 6 is a diagram for illustrating a system configuration mainly including a power conversion device according to Embodiment 4 of the present invention. In FIG. 6, the devices and the like denoted by the same reference symbols as those in FIG. 1 and other drawings perform the same operations and the like as those described in Embodiment 1 and other embodiments.

The power conversion device of this embodiment is configured so that the signal generating module device 200 has the function of the drive signal transmission device 7. The signal generating module device 200 therefore generates the drive signal sa and also sends the drive signal SA, which is a signal converted from the drive signal sa, directly to the boosting device 2. The generated drive signal sa is transmitted to the controller 100 as well, as in the power conversion device of Embodiment 2. The controller 100 generates the commutation signal sb and sends the commutation signal sb to the commutation signal transmission device 8. The configuration of this embodiment is suitable for the case where the generation of the commutation signal sb is to be executed in the controller 100.

With the signal generating module device 200 handling the generation of the drive signal sa (the drive signal SA) as described above, the controller 100 does not need to generate the drive signal sa and is accordingly lessened in processing load. The configuration of this embodiment is also short in the signal transmission distance from the controller 100 to the boost open/close switch unit 22, and is accordingly superior with respect to external noise. In addition, the on-pulse of the operation signal sw is longer than the length of time where the drive signal sa and the commutation signal sb are turned on as in the power conversion device of Embodiment 1, which lightens the processing load on the controller 100. Further, heat generation in the controller 100 is suppressed and the number of input/output terminals may be reduced. As described in Embodiment 1, the signal generating module device 200 may send an operation request signal to the controller 100 to determine whether the controller 100 is to put the boosting device 2 and the commutation device 4 into operation.

Embodiment 5

Figure 7:
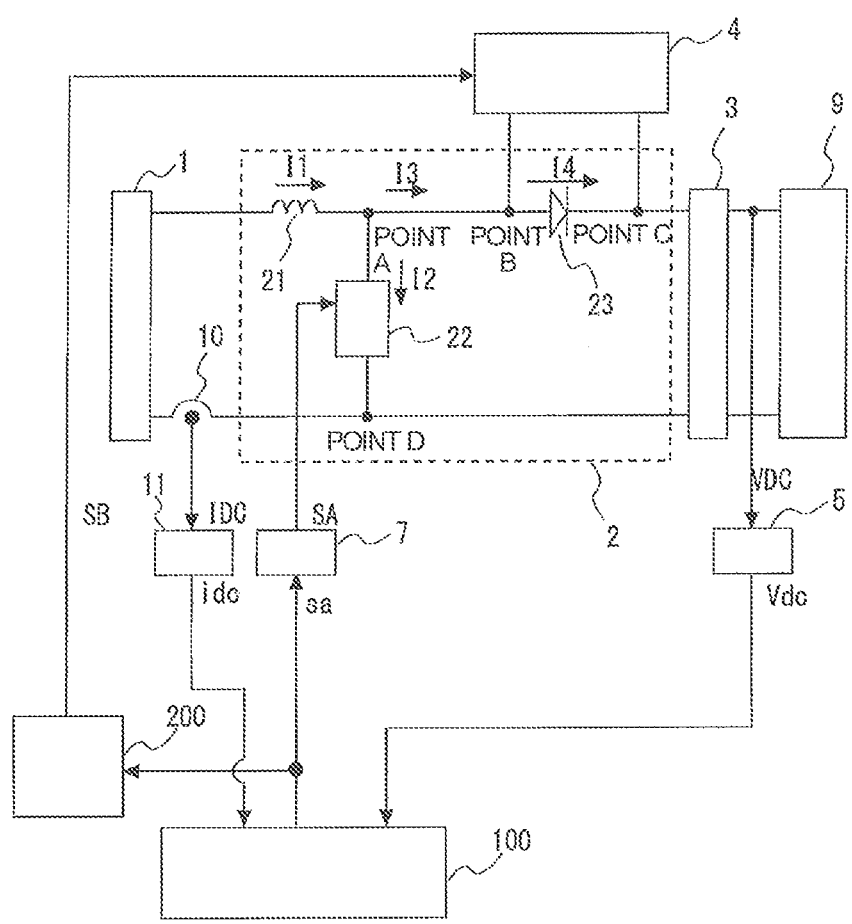
FIG. 7 is a diagram for illustrating a system configuration mainly including a power conversion device according to Embodiment 5 of the present invention.

FIG. 7 is a diagram for illustrating a system configuration mainly including a power conversion device according to Embodiment 5 of the present invention. In FIG. 7, the devices and the like denoted by the same reference symbols as those in FIG. 1 and other drawings perform the same operations and the like as those described in Embodiment 1 and other embodiments. The power conversion device of this embodiment is configured so that the signal generating module device 200 has the function of the commutation signal transmission device 8. The signal generating module device 200 therefore generates the commutation signal sb and also sends the commutation signal SB, which is a signal converted from the commutation signal sb, to the commutation device 4.

The power conversion device of this embodiment has a configuration in which the signal generating module device 200 has the function of the commutation signal transmission device 8. The power conversion device configured as illustrated in FIG. 7 is suitable for, for example, the case where the drive signal sa sent to the boosting device 2 is to be generated in the controller 100, whereas the commutation signal SB sent to the commutation device 4 is to be generated by the signal generating module device 200 in a general manner. The controller 100 in this embodiment generates the drive signal sa based on at least one of a voltage relating to the detection by the voltage detection device 5 or a current relating to the detection by the current detection element 10 and the current detection device 11. The controller 100 sends the generated drive signal sa to the drive signal transmission device 7 and to the signal generating module device 200 as well. Based on the drive signal sa, the signal generating module device 200 generates the commutation signal SB that is matched to the drive signal sa in terms of timing and the like, and sends the commutation signal SB to the commutation device 4.

With the signal generating module device 200 handling the generation of the commutation signal SB as described above, the controller 100 does not need to generate the commutation signal sb and is accordingly lessened in processing load. In addition, replacement from a power conversion device of the related art may be achieved with relative ease in the case where the existing controller 100 is capable of generating and sending the drive signal sa of the boosting device 2. The processing load on the controller 100 may also be lightened because the on-pulse of the drive signal sa is longer than the length of time where the commutation signal sb is turned on as in the power conversion device of Embodiment 3. Further, heat generation in the controller 100 may be suppressed, and the number of input/output terminals may be reduced. The configuration of this embodiment is also short in the signal transmission distance from the controller 100 to the commutation switch 44 (the commutation device 4), and is accordingly superior with respect to external noise.

Embodiment 6

Figure 8:
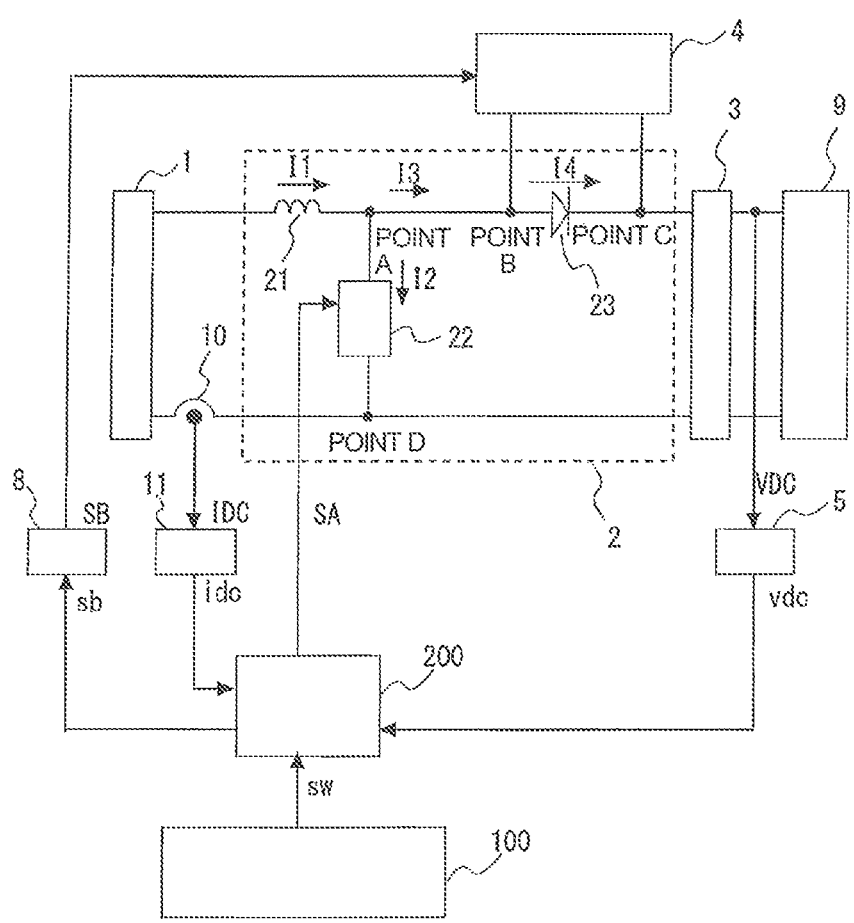
FIG. 8 is a diagram for illustrating a system configuration mainly including a power conversion device according to Embodiment 6 of the present invention.

FIG. 8 is a diagram for illustrating a system configuration mainly including a power conversion device according to Embodiment 6 of the present invention. In FIG. 8, the devices and the like denoted by the same reference symbols as those in FIG. 1 and other drawings perform the same operations and the like as those described in Embodiment 1 and other embodiments.

The power conversion device of this embodiment is configured so that the signal generating module device 200 has the function of the drive signal transmission device 7. The signal generating module device 200 therefore generates the drive signal sa and also sends the drive signal SA, which is a signal converted from the drive signal sa, directly to the boosting device 2. The signal generating module device 200 generates the commutation signal sb as well and sends the commutation signal sb to the commutation signal transmission device 8.

With the signal generating module device 200 handling the generation of the drive signal SA and the commutation signal sb) as described above, the controller 100 does not need to generate the signals and is accordingly lessened in processing load. The configuration of this embodiment is also short in the signal transmission distance from the controller 100 to the boost open/close switch unit 22, and is accordingly superior with respect to external noise. In addition, the on-pulse of the operation signal sw is longer than the length of time where the drive signal sa and the commutation signal sb are turned on as in the power conversion device of Embodiment 1, which lightens the processing load on the controller 100. Further, heat generation in the controller 100 is suppressed and the number of input/output terminals may be reduced. As described in Embodiment 1, the signal generating module device 200 may send an operation request signal to the controller 100 to determine whether the controller 100 is to put the boosting device 2 and the commutation device 4 into operation.

Embodiment 7

Figure 9:
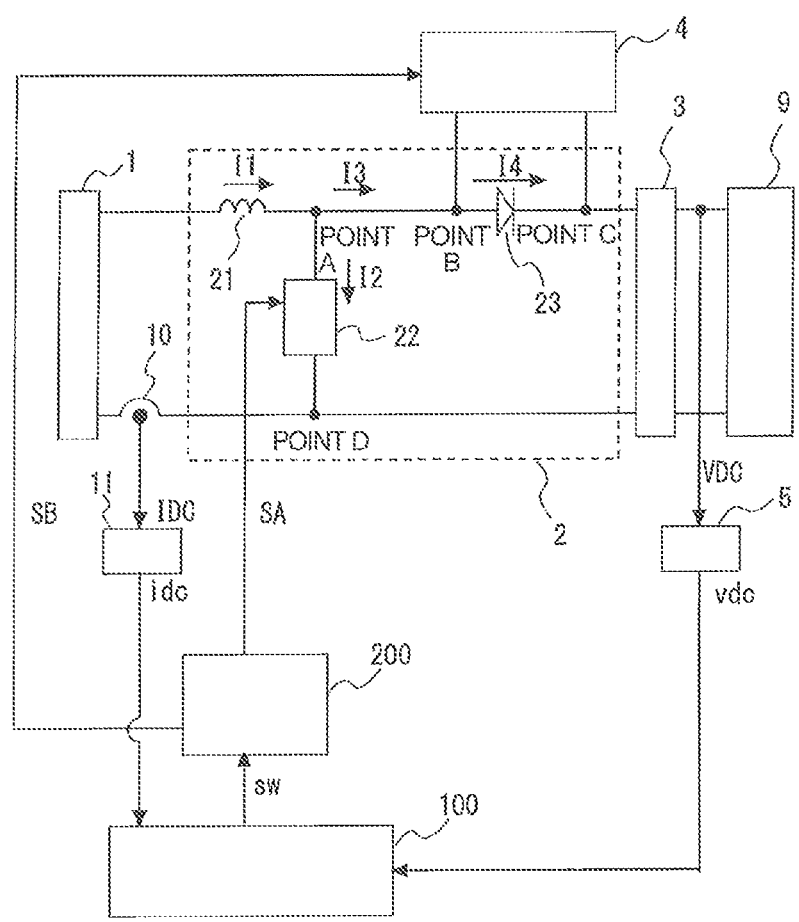
FIG. 9 is a diagram for illustrating a system configuration mainly including a power conversion device according to Embodiment 7 of the present invention.

FIG. 9 is a diagram for illustrating a system configuration mainly including a power conversion device according to Embodiment 7 of the present invention. In FIG. 9, the devices and the like denoted by the same reference symbols as those in FIG. 1 and other drawings perform the same operations and the like as those described in Embodiment 1 and other embodiments.

The power conversion device of this embodiment is configured so that the signal generating module device 200 has the function of the drive signal transmission device 7 and the commutation signal transmission device 8. The signal generating module device 200 converts the drive signal sa that is generated by the controller 100 into the drive signal SA, and sends the drive signal SA to the boosting device 2. The signal generating module device 200 also generates the commutation signal sb, converts the commutation signal sb into the commutation signal SB, and sends the commutation signal SB to the commutation device 4.

With the signal generating module device 200 handling the generation of the drive signal SA and the commutation signal SB as described above, the controller 100 only needs to generate the drive signal sa and is accordingly lessened in processing load. The processing load on the controller 100 may also be lightened because the on-pulse of the operation signal sw is longer than the length of time where the drive signal sa and the commutation signal sb are turned on as in the power conversion device of Embodiment 1. Further, heat generation in the controller 100 may be suppressed, and the number of input/output terminals may be reduced. The configuration of this embodiment is also short in the signal transmission distance from the controller 100 to the boost open/close switch unit 22 and the commutation switch 44, and is accordingly superior with respect to external noise.

Embodiment 8

Figure 10:
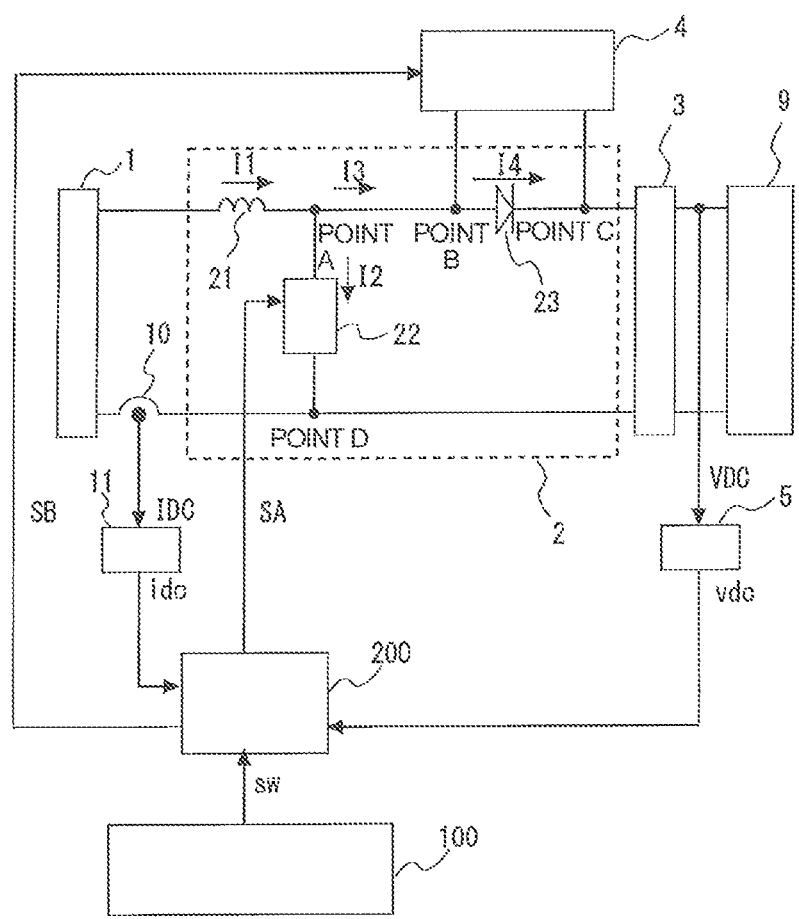
FIG. 10 is a diagram for illustrating a system configuration mainly including a power conversion device according to Embodiment 8 of the present invention.

FIG. 10 is a diagram for illustrating a system configuration mainly including a power conversion device according to Embodiment 8 of the present invention. In FIG. 10, the devices and the like denoted by the same reference symbols as those in FIG. 1 and other drawings perform the same operations and the like as those described in Embodiment 1 and other embodiments.

The power conversion device of this embodiment is configured so that the signal generating module device 200 has the function of the drive signal transmission device 7 and the commutation signal transmission device 8. The signal generating module device 200 therefore generates the drive signal sa and also sends the drive signal SA, which is a signal converted from the drive signal sa, directly to the boosting device 2. The signal generating module device 200 generates the commutation signal sb as well, and sends the commutation signal SB, which is a signal converted from the commutation signal sb, directly to the commutation device 4.

With the signal generating module device 200 handling the generation of the drive signal SA and the commutation signal sb as described above, the controller 100 does not need to generate the signals and is accordingly lessened in processing load. The configuration of this embodiment is also short in the signal transmission distance from the controller 100 to the boost open/close switch unit 22, and is accordingly superior with respect to external noise. In addition, the on-pulse of the operation signal sw is longer than the length of time where the drive signal sa and the commutation signal sb are turned on as in the power conversion device of Embodiment 1, which lightens the processing load on the controller 100. Further, heat generation in the controller 100 is suppressed and the number of input/output terminals may be reduced. As described in Embodiment 1, the signal generating module device 200 may send an operation request signal to the controller 100 to determine whether the controller 100 is to put the boosting device 2 and the commutation device 4 into operation. As described in Embodiment 1, the signal generating module device 200 may send an operation request signal to the controller 100 to determine whether the controller 100 is to put the boosting device 2 and the commutation device 4 into operation.

Embodiment 9

Figure 11:
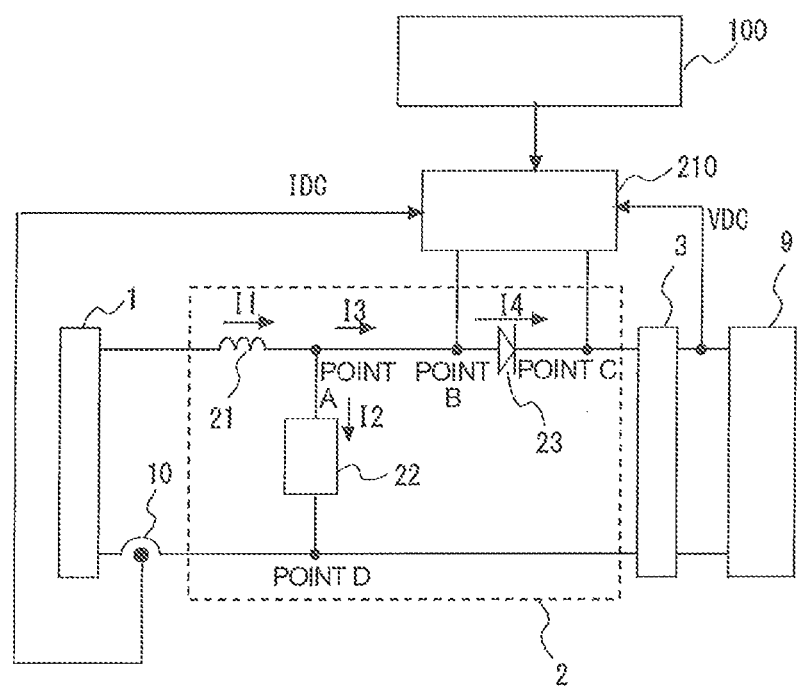
FIG. 11 is a diagram for illustrating a system configuration mainly including a power conversion device according to Embodiment 9 of the present invention.

FIG. 11 is a diagram for illustrating a system configuration mainly including a power conversion device according to Embodiment 9 of the present invention. In FIG. 11, the devices and the like denoted by the same reference symbols as those in FIG. 1 and other drawings perform the same operations and the like as those described in Embodiment 1 and other embodiments.

The power conversion device of this embodiment includes a signal generating module device 210. The signal generating module device 210 of this embodiment is a device in which the commutation device 4, the voltage detection device 5, the current detection device 11, the drive signal transmission device 7, and the commutation signal transmission device 8 of FIG. 1 are configured as a module. This embodiment is suitable for, for example, the case where the control device 100 does not control the boosting device 2 in an existing power conversion device, and a new external device is to execute in a general manner the generation of the drive signal sa of the boosting device 2, the drive signal SA of the drive signal transmission device 7, which transmits the drive signal sa, the commutation signal sb, and the commutation signal SB of the commutation signal transmission device 8, which transmits the commutation signal sb, and the function of the commutation device 4.

With the signal generating module device 210 handling the transmission and the commutation operation of the drive signal SA as described above, the controller 100 does not need to generate the signal and is accordingly lessened in processing load. The signal generating module device 210 also has the function of generating the commutation signal sb, the function of the commutation device 4, and the function of the commutation signal transmission device 8. The commutation signal SB is accordingly exchanged inside the signal generating module device 210. The drive signal SA is sent directly to the boosting device 2 from the signal generating module device 210. This makes the signal transmission distance short and makes the power conversion device superior with respect to external noise. As described in Embodiment 1, the signal generating module device 200 may send an operation request signal to the controller 100 to determine whether the controller 100 is to put the boosting device 2 and the commutation device 4 into operation.

Embodiment 10

Figure 12:
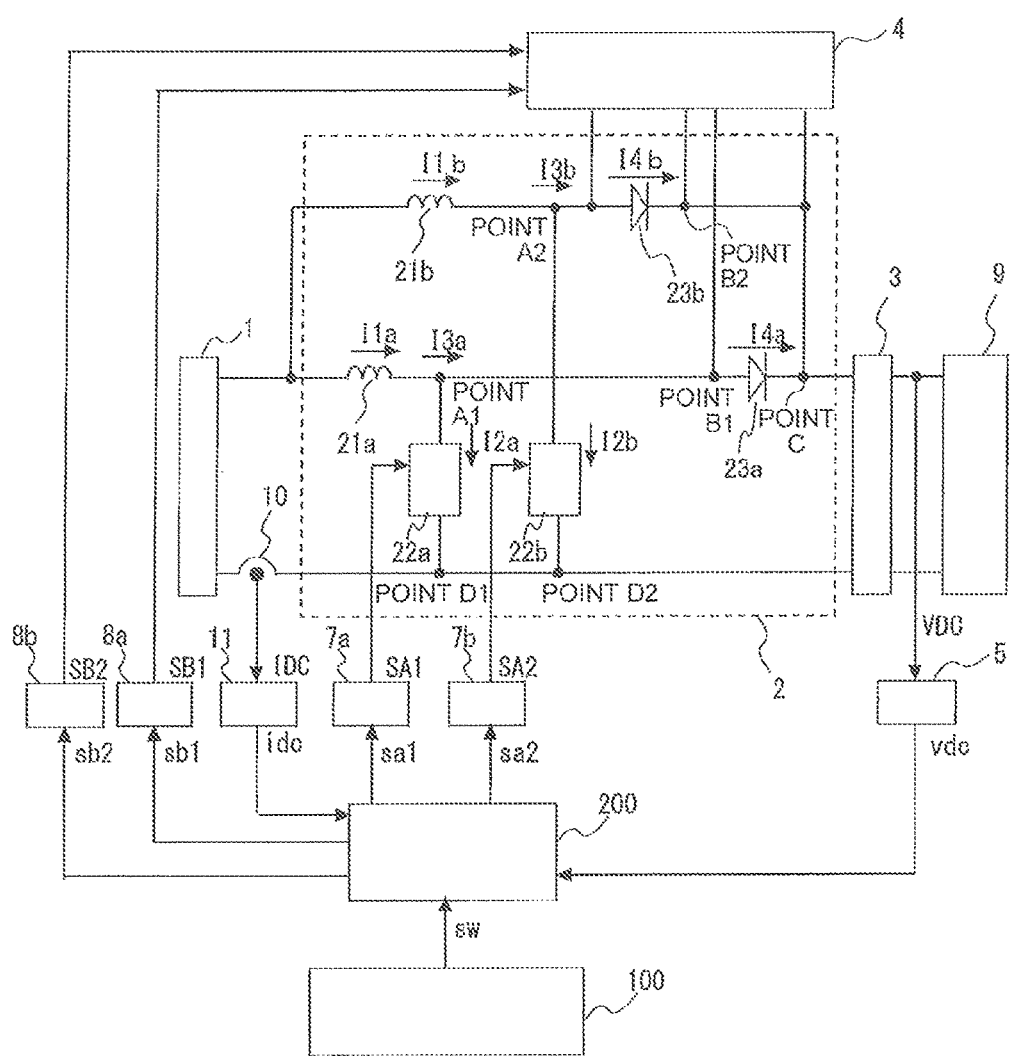
FIG. 12 is a diagram for illustrating a (first) system configuration mainly including a power conversion device according to Embodiment 10 of the present invention.
Figure 13:
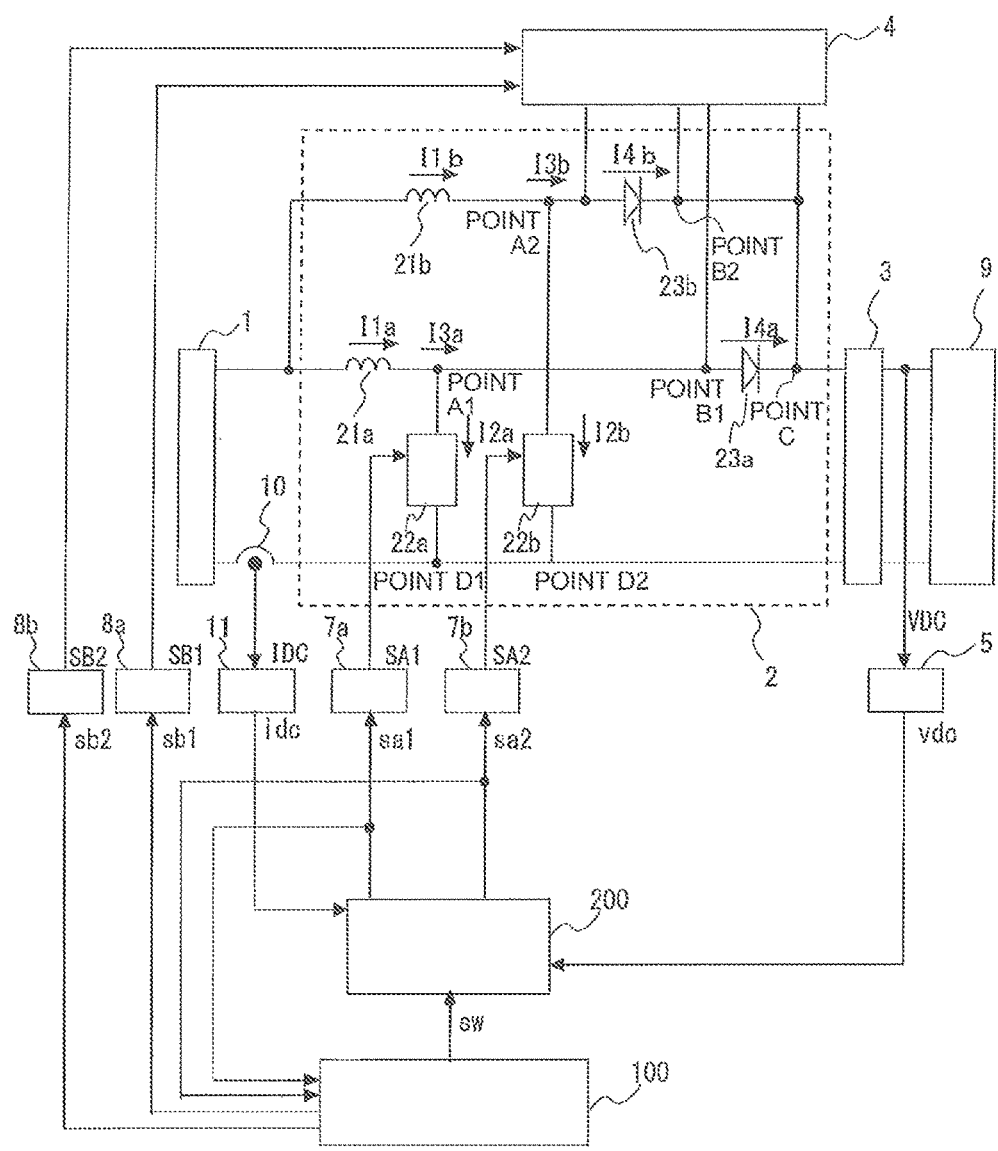
FIG. 13 is a diagram for illustrating a (second) system configuration mainly including the power conversion device according to Embodiment 10 of the present invention.
Figure 14:
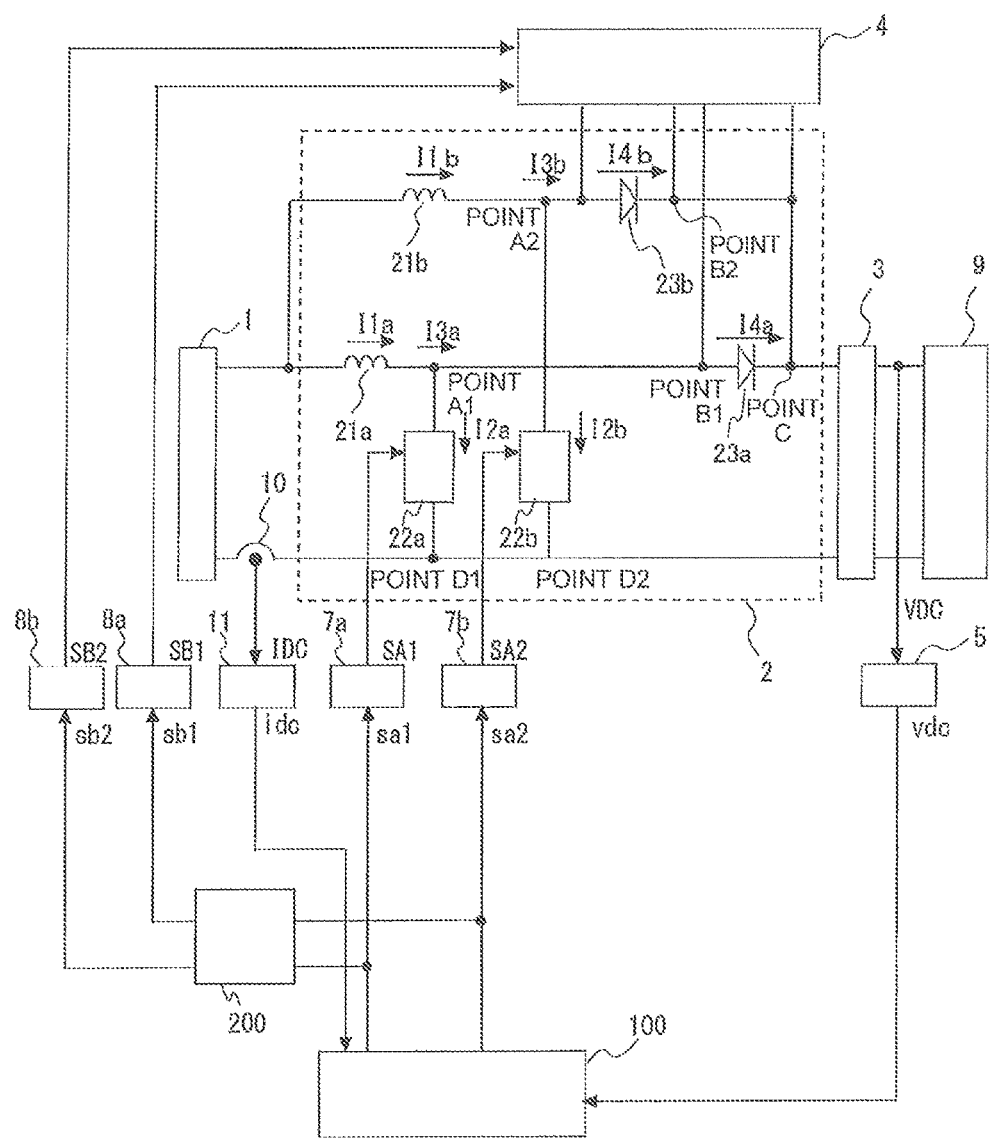
FIG. 14 is a diagram for illustrating a (third) system configuration mainly including the power conversion device according to Embodiment 10 of the present invention.
Figure 15:
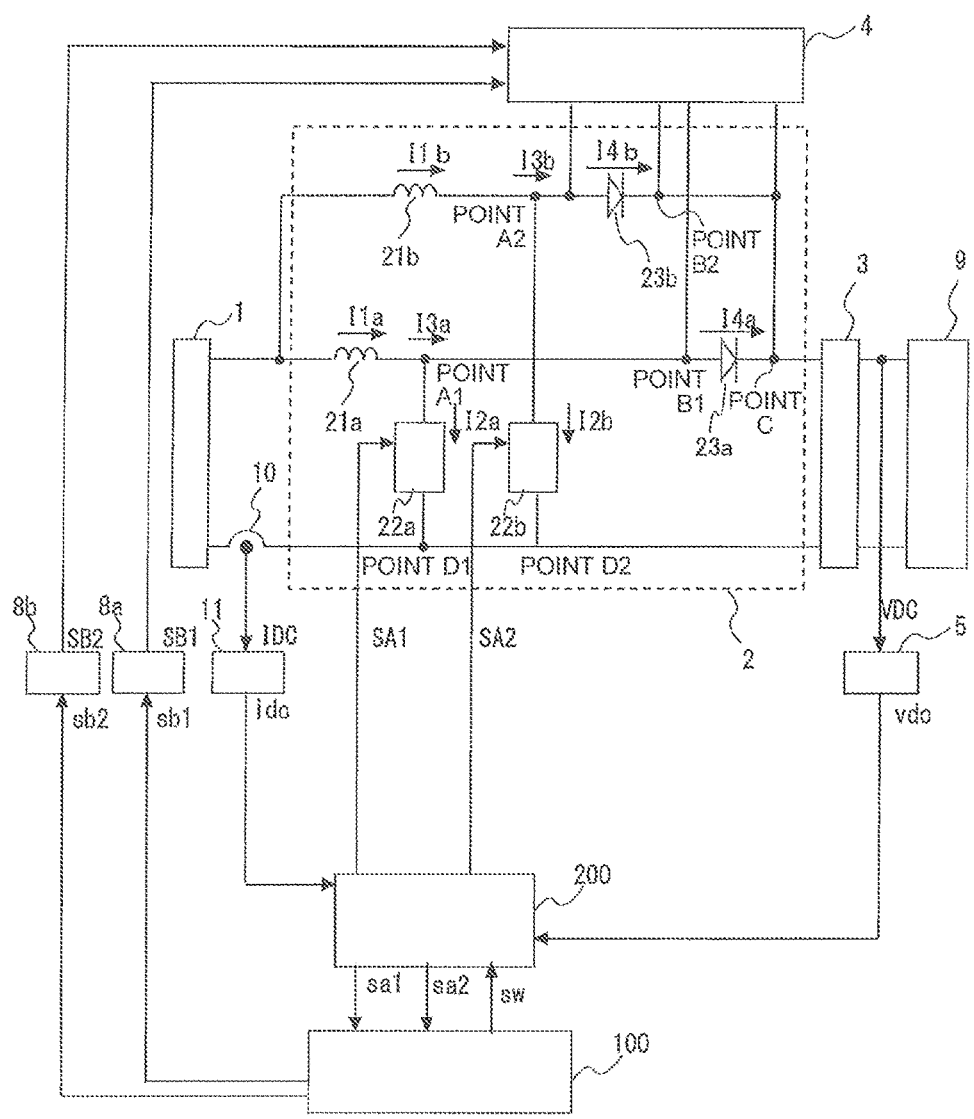
FIG. 15 is a diagram for illustrating a (fourth) system configuration mainly including the power conversion device according to Embodiment 10 of the present invention.
Figure 16:
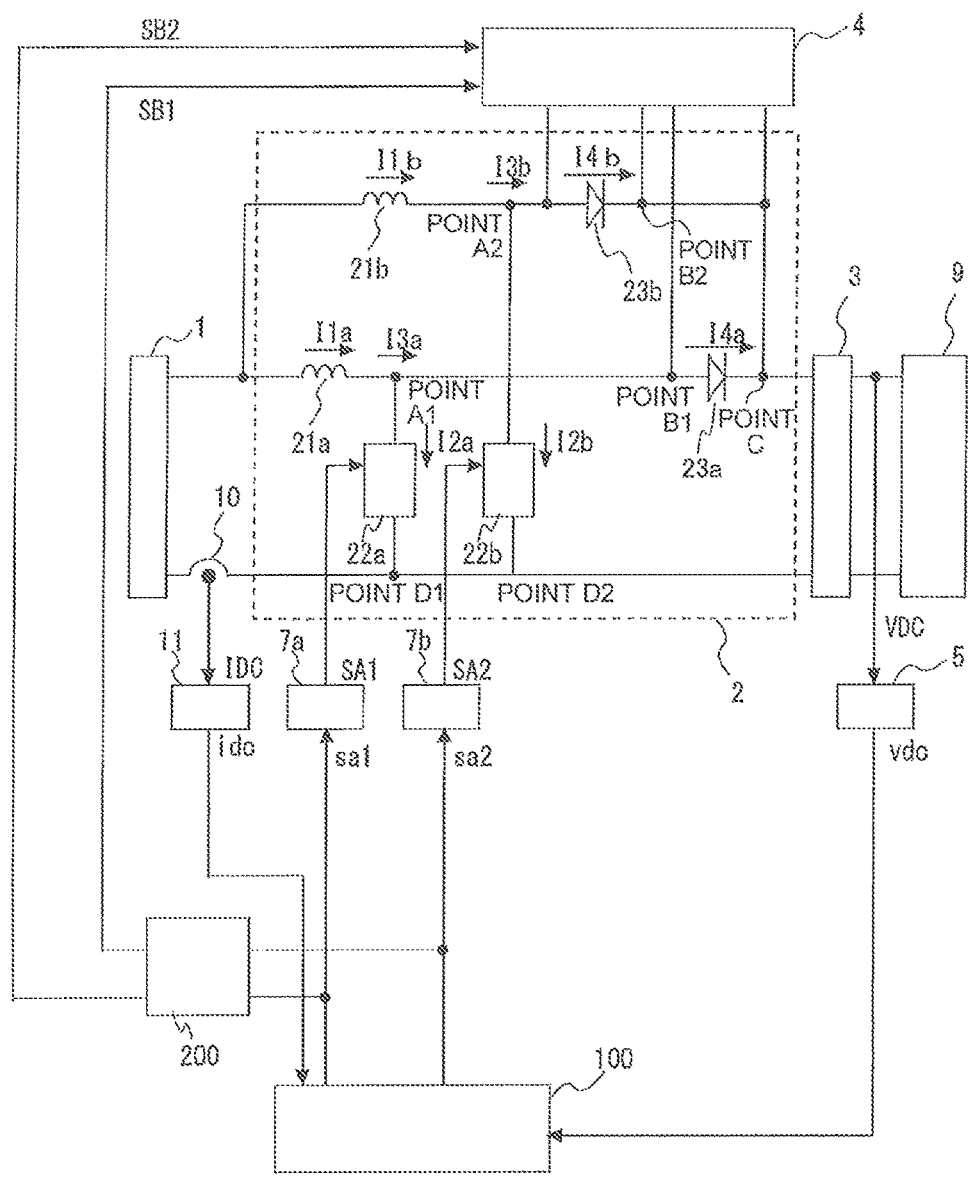
FIG. 16 is a diagram for illustrating a (fifth) system configuration mainly including the power conversion device according to Embodiment 10 of the present invention.
Figure 17:
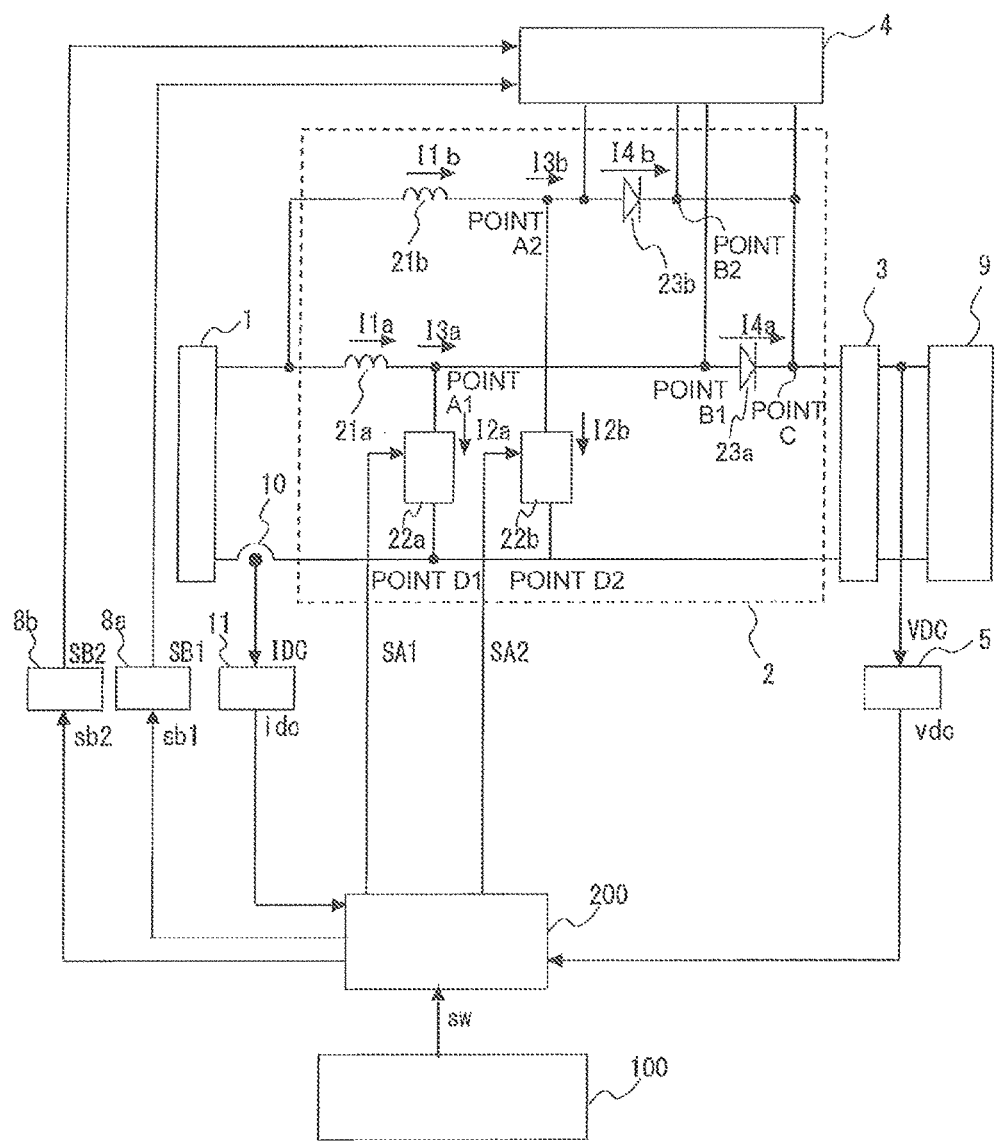
FIG. 17 is a diagram for illustrating a (sixth) system configuration mainly including the power conversion device according to Embodiment 10 of the present invention.
Figure 18:
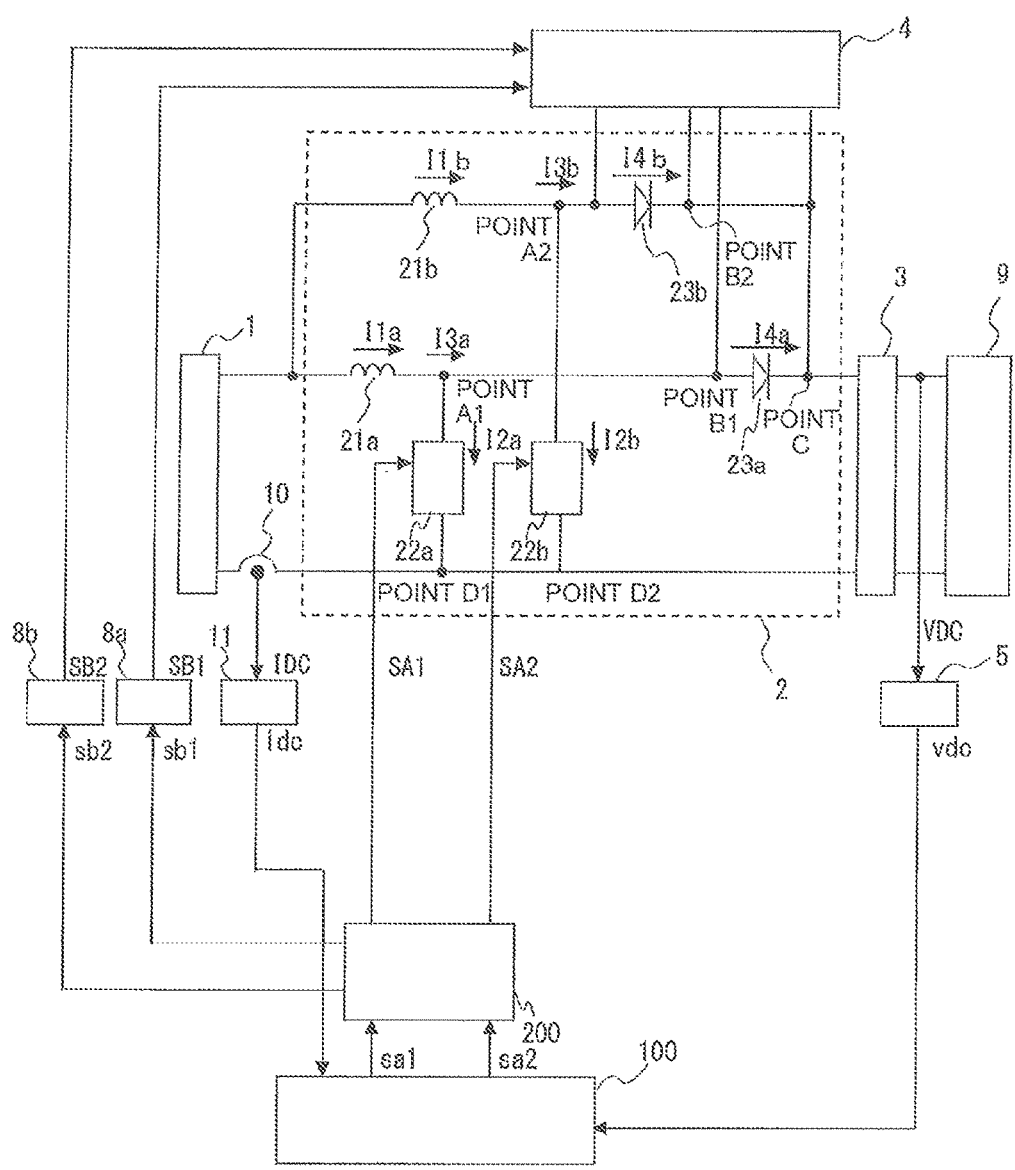
FIG. 18 is a diagram for illustrating a (seventh) system configuration mainly including the power conversion device according to Embodiment 10 of the present invention.
Figure 19:
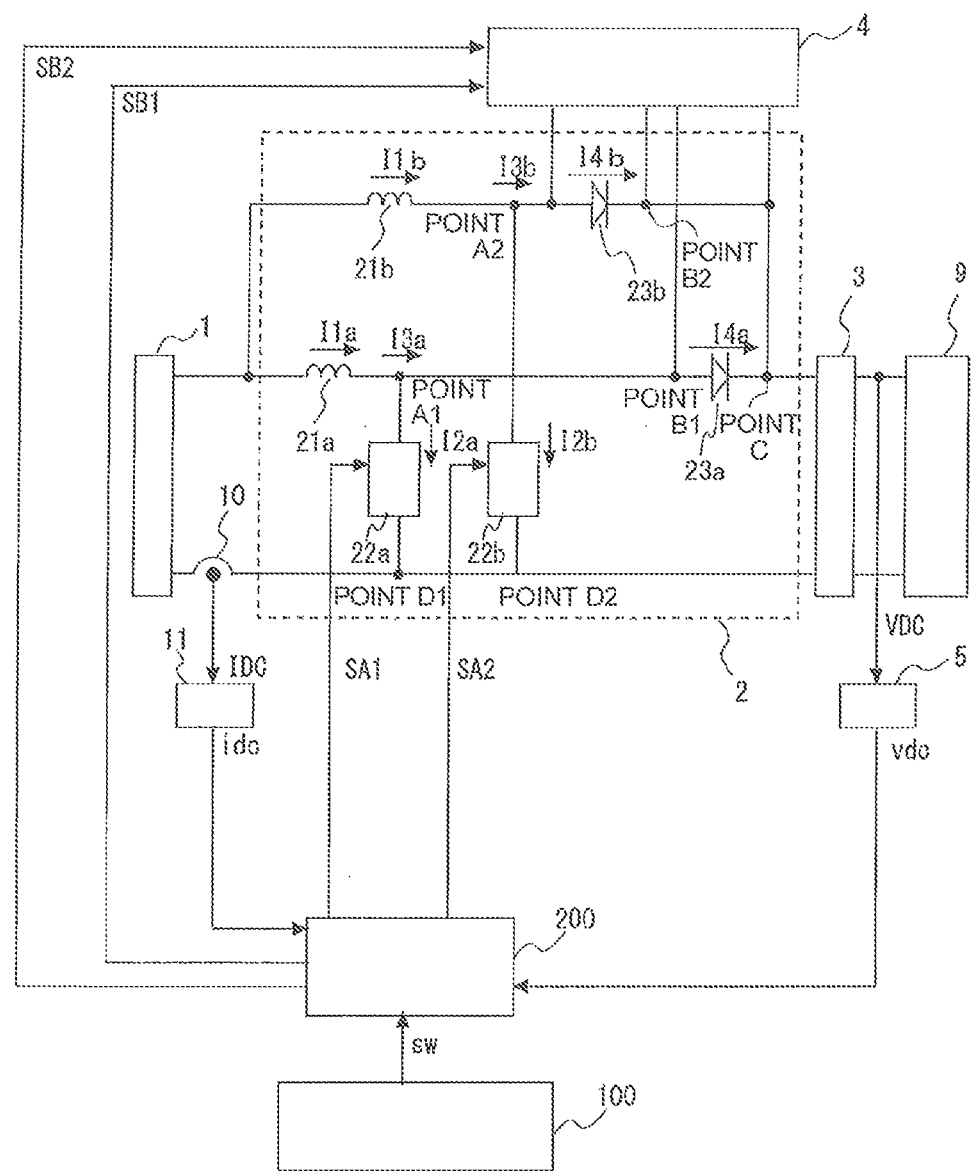
FIG. 19 is a diagram for illustrating a (an eighth) system configuration mainly including the power conversion device according to Embodiment 10 of the present invention.
Figure 20:
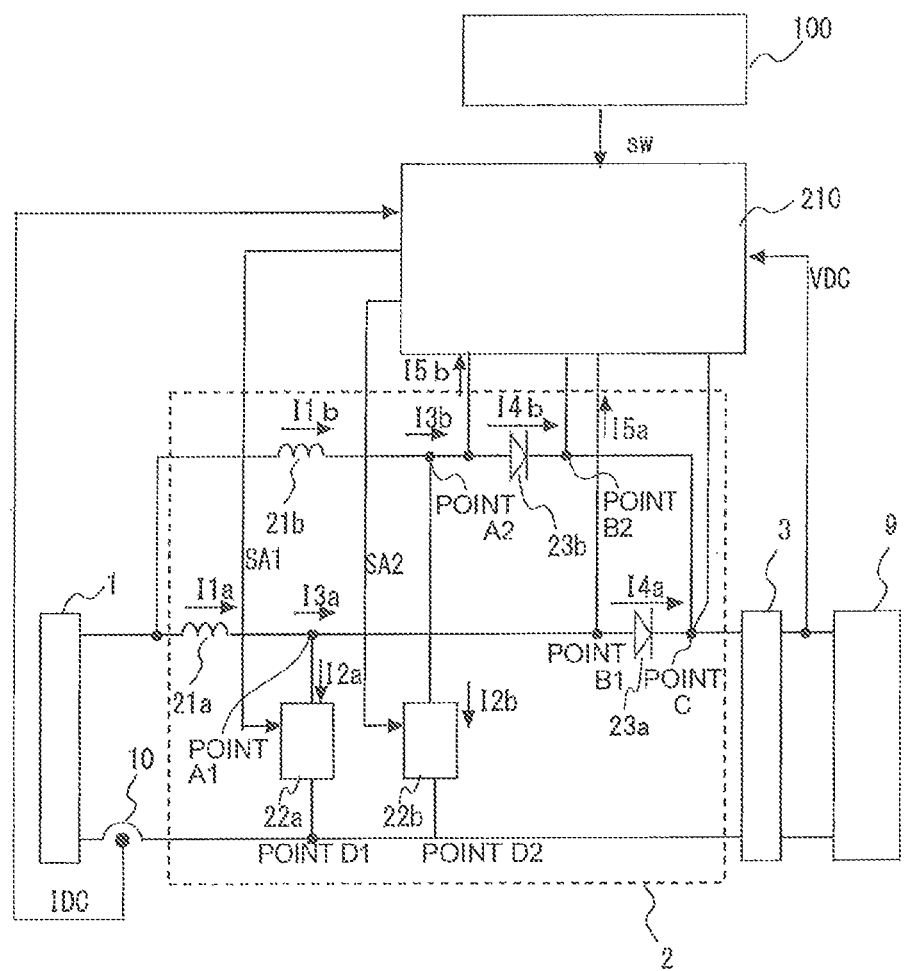
FIG. 20 is a diagram for illustrating a (ninth) system configuration mainly including the power conversion device according to Embodiment 10 of the present invention.

FIG. 12 is a diagram for illustrating a (first) system configuration mainly including a power conversion device according to Embodiment 10 of the present invention. In FIG. 12, the devices and the like denoted by the same reference symbols as those in FIG. 1 and other drawings perform the same operations and the like as those described in Embodiment 1 and other embodiments. This embodiment includes two pairs of the boosting device 2 and the commutation device 4, which are connected so that the boosting device 2 and the commutation device 4 in each pair are parallel to each other between the power source 1 and the load 9 (the smoothing device 3).

In this embodiment, where there are two boost open/close switch units 22 (two boosting devices 2), the signal generating module device 200 accordingly generates a drive signal sa1 and a drive signal sa2, which are sent to a drive signal transmission device 7a and a drive signal transmission device 7b, respectively. The signal generating module device 200 also generates a commutation signal sb1 and a commutation signal sb2, which are sent to a commutation signal transmission device 8a and a commutation signal transmission device 8b, respectively, because there are two commutation switches 44 (two commutation devices 4). Switching may be executed with the phase in one pair staggered from the phase in the other pair in order to, for example, lighten a current burden on the switches or reduce the capacity of each magnetic energy storage unit 21 by raising the frequency. In the case where there are many signals to generate as this, the presence of the signal generating module device 200 lessens the processing load on the controller 100. The processing load on the controller 100 is lightened also because the on-pulse of the operation signal sw is longer than the length of time where each drive signal sa and each commutation signal sb are turned on as in the power conversion device of Embodiment 1. Further, heat generation in the controller 100 is suppressed and the number of input/output terminals may be reduced.

FIG. 13 to FIG. 20 are diagrams for illustrating other examples of the system configuration mainly including the power conversion device according to Embodiment 10 of the present invention. In FIG. 13 to FIG. 20, a device or a component denoted by the same reference symbol (disregarding suffixes) that is used in FIG. 4 to FIG. 11 has the same function, executes the same operation, and has the same effect as those described in Embodiment 2 to Embodiment 9, and has the same effect as that of the power conversion device of FIG. 12.

Embodiment 11

In the above-mentioned embodiments, a description has been given of the power conversion device in which the boosting device 2 is subjected to the commutation by the commutation device 4 and which performs power conversion by boosting the voltage of the power source 1, but the present invention is not limited thereto. The same effects as those described above in each of the embodiments may be exerted even in a power conversion device in which the boosting device 2 is replaced with a voltage changing device as exemplified by a buck device and a boost/buck device, which is capable of converting electric power to be supplied to the load 9 through the change in voltage.

Embodiment 12

Figure 21:
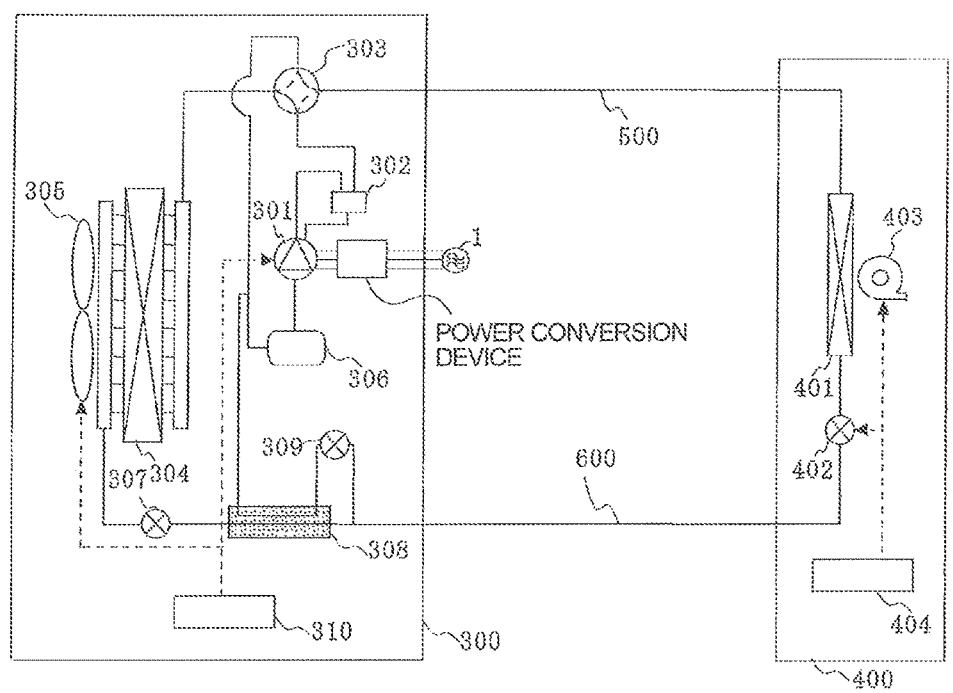
FIG. 21 is a configuration diagram of a refrigerating and air-conditioning apparatus according to Embodiment 12 of the present invention.

FIG. 21 is a configuration diagram of a refrigerating and air-conditioning apparatus according to Embodiment 12 of the present invention. In this embodiment, a description is given of a refrigerating and air-conditioning apparatus to be supplied with electric power via the above-mentioned power conversion device. The refrigerating and air-conditioning apparatus of FIG. 21 includes a heat source-side unit (outdoor unit) 300 and a load-side unit (indoor unit) 400. The heat source-side unit 300 and the load-side unit 400 are coupled to each other via refrigerant pipes, to thereby form a main refrigerant circuit to circulate refrigerant. In the refrigerant pipes, one pipe through which gas refrigerant flows is referred to as "gas pipe 500", and the other pipe through which liquid refrigerant (sometimes, two-phase gas-liquid refrigerant) flows is referred to as "liquid pipe 600".

In this embodiment, the heat source-side unit 300 includes respective devices (units), namely, a compressor 301, an oil separator 302, a four-way valve 303, a heat source-side heat exchanger 304, a heat source-side fan 305, an accumulator 306, a heat source-side expansion device (expansion valve) 307, an intermediate heat exchanger 308, a bypass expansion device 309, and a heat source-side controller 310.

The compressor 301 compresses and discharges the sucked refrigerant. In this case, the compressor 301 may arbitrarily change an operating frequency thereof so that the capacity of the compressor 301 (the amount of refrigerant sent per unit time) may be finely changed. Then, the power conversion device described above in each of the embodiments is mounted between the power source 1 configured to supply electric power for driving the compressor 301 (motor) and the compressor 301 and other devices serving as the load 9.

The oil separator 302 separates lubricant oil which is mixed in the refrigerant and discharged from the compressor 301. The separated lubricant oil is returned to the compressor 301. The four-way valve 303 switches the flow of the refrigerant between a cooling operation and a heating operation based on an instruction from the heat source-side controller 310. Further, the heat source-side heat exchanger 304 exchanges heat between the refrigerant and the air (outside air). For example, in the heating operation, the heat source-side heat exchanger 304 functions as an evaporator, and exchanges heat between low-pressure refrigerant flowing into the heat source-side heat exchanger 304 via the heat source-side expansion device 307 and the air, to thereby evaporate and gasify the refrigerant. On the other hand, in the cooling operation, the heat source-side heat exchanger 304 functions as a condenser, and exchanges heat between refrigerant flowing into the heat source-side heat exchanger 304 from the four-way valve 303 side and compressed by the compressor 301 and the air, to thereby condense and liquefy the refrigerant. The heat source-side fan 305 is provided to the heat source-side heat exchanger 304 in order to efficiently exchange heat between the refrigerant and the air. The heat source-side fan 305 may also be supplied with electric power via the power conversion device described above in each of the embodiments, and, for example, an operating frequency of a fan motor may be arbitrarily changed by an inverter device serving as the load 9 so that the rotation speed of the fan may be finely changed.

The intermediate heat exchanger 308 exchanges heat between refrigerant flowing through a main passage of the refrigerant circuit and refrigerant branching from the passage to have the flow rate adjusted by the bypass expansion device 309 (expansion valve). In particular, when the refrigerant needs to be subcooled in the cooling operation, the intermediate heat exchanger 308 subcools the refrigerant and supplies the subcooled refrigerant to the load-side unit 400. Liquid flowing via the bypass expansion device 309 is returned to the accumulator 306 via a bypass pipe. The accumulator 306 is a unit configured to store excess liquid refrigerant, for example. The heat source-side controller 310 is constructed with a microcomputer, for example. Then, the heat source-side controller 310 may communicate to and from the load-side controller 404 through wired or wireless connection, and, for example, based on data relating to detection by various kinds of detection units (sensors) included in the refrigerating and air-conditioning apparatus, controls the respective devices (units) of the refrigerating and air-conditioning apparatus, such as the control of the operating frequency of the compressor 301 by inverter circuit control, to thereby control the operation of the overall refrigerating and air-conditioning apparatus. Further, the processing performed by the controller 100 described above in each of the embodiments may be performed by the heat source-side controller 310.

Besides, the load-side unit 400 includes a load-side heat exchanger 401, a load-side expansion device (expansion valve) 402, a load-side fan 403, and a load-side controller 404. The load-side heat exchanger 401 exchanges heat between the refrigerant and the air. For example, in the heating operation, the load-side heat exchanger 401 functions as a condenser, and exchanges heat between refrigerant flowing into the load-side heat exchanger 401 from the gas pipe 500 and the air, to thereby condense and liquefy the refrigerant (or turn the refrigerant into two-phase gas-liquid state), and discharges the refrigerant to the liquid pipe 600 side. On the other hand, in the cooling operation, the load-side heat exchanger 401 functions as an evaporator, and exchanges heat between refrigerant reduced in pressure by the load-side expansion device 402 and the air, to thereby cause the refrigerant to receive the heat of the air to evaporate and gasify the refrigerant, and discharge the refrigerant to the gas pipe 500 side. Further, the load-side fan 403 configured to adjust the flow of the air subjected to heat exchange is provided to the load-side unit 400. The operating speed of the load-side fan 403 is determined based on user's setting, for example. The load-side expansion device 402 is provided in order to regulate the pressure of the refrigerant in the load-side heat exchanger 401 by being changed in opening degree.

Further, the load-side controller 404 is also constructed with a microcomputer, and may communicate to and from the heat source-side controller 310 through wired or wireless communication, for example. The load-side controller 404 controls the respective devices (units) of the load-side unit 400 based on an instruction from the heat source-side controller 310 or an instruction from a resident so that, for example, the indoor space may have a predetermined temperature. Further, the load-side controller 404 transmits a signal including data relating to detection by a detection unit provided to the load-side unit 400.

As described above, in the refrigerating and air-conditioning apparatus according to Embodiment 12, the power conversion device according to each of the above-mentioned embodiments is used to supply electric power to the compressor 301, the heat source-side fan 305, and other devices.

Consequently, the highly efficient, highly reliable, and power saving refrigerating and air-conditioning apparatus may be obtained.

INDUSTRIAL APPLICABILITY

In Embodiment 12 described above, a description has been given of the case where the power conversion device according to the present invention is applied to a refrigerating and air-conditioning apparatus, but the present invention is not limited thereto. The power conversion device according to the present invention is applicable also to a heat pump apparatus, an apparatus using a refrigeration cycle (heat pump cycle) such as a refrigerator, a conveyance apparatus such as an elevator, a lighting apparatus (system), a hybrid vehicle, a power conditioner for photovoltaic power generation, and the like.

The invention claimed is:

1. A power conversion device configured to convert electric power from a power source to a load, comprising:
   a voltage changing device including a rectification unit configured to prevent backflow of a current from a side of the load to a side of the power source, the voltage changing device being configured to change a voltage of power from the power source to a predetermined voltage;
   a commutation device configured to perform commutation operation in which a current flowing through the voltage changing device is caused to flow into an other path;
   a controller that outputs a master operational signal that includes an on edge and an off edge, the on edge and the off edge are separated by an on-pulse width that defines a predetermined on period of the master operational signal; and
   a signal generating module device that receives the master operational signal as an input command signal from the controller to put the voltage changing device and the commutation device into or out of operation during the on period of the master operational signal, and that outputs both a drive signal for running the voltage changing device and a commutation signal for running the commutation device that only turn on during the predetermined on period of the master operational signal, wherein
   the on pulse width of the master operational signal is greater than a length of time where the drive signal generated by the signal generating module device is turned on and greater than a length of time where the commutation signal generated by the signal generating module device is turned on, which only turn on between the on edge and the off edge of the predetermined on period of the master operational signal.

2. The power conversion device of claim 1, wherein the signal generating module device is configured to send an operation request signal and receive the master operational signal in response.

3. The power conversion device of claim 1, wherein the voltage changing device includes an open/close switch unit configured to change voltage by switching, and is configured to cause the commutation device to start the commutation operation before the open/close switch unit is closed.

4. The power conversion device of claim 1, wherein the voltage changing device includes a magnetic energy storage unit including a reactor.

5. The power conversion device of claim 1,
   wherein the voltage changing device includes an open/close switch unit configured to change voltage by switching, and
   wherein the open/close switch unit includes an insulated gate bipolar transistor or a metal oxide semiconductor field effect transistor.

6. The power conversion device of claim 1, wherein the rectification unit includes a rectifier.

7. The power conversion device of claim 1, wherein the commutation device includes a transformer configured to apply a voltage that is induced by a current flowing through a primary-side winding to a secondary-side winding, which is on the other path.

8. The power conversion device of claim 7, wherein the transformer includes a pulse transformer.

9. The power conversion device of claim 7, wherein the primary-side winding of the transformer is provided with a reset winding.

10. The power conversion device of claim 1, wherein the commutation device includes a commutation rectification element configured to rectify the current flowing through the other path.

11. The power conversion device of claim 10, wherein the commutation rectification element includes an element using a wide band-gap semiconductor.

12. The power conversion device of claim 11, wherein the wide band-gap semiconductor includes silicon carbide, a gallium nitride-based material, or diamond as a material of the wide band-gap semiconductor.

13. The power conversion device of claim 1, wherein the signal generating module device sends the drive signal and the commutation signal to the voltage changing device and the commutation device while being instructed to run by the master operation signal.

* * * * *